United States Patent
Trundle et al.

(10) Patent No.: US 9,386,281 B2
(45) Date of Patent: Jul. 5, 2016

(54) IMAGE SURVEILLANCE AND REPORTING TECHNOLOGY

(71) Applicant: Alarm.com Incorporated, Vienna, VA (US)

(72) Inventors: Stephen Scott Trundle, Falls Church, VA (US); Robert J. McCarthy, Jr., Vienna, VA (US); Jean-Paul Martin, Oakton, VA (US); Alison Jane Slavin, Vienna, VA (US); David Hutz, Herndon, VA (US)

(73) Assignee: Alarm.com Incorporated, Tysons, VA (US)

( * ) Notice: Subject to any disclaimer, the term of this patent is extended or adjusted under 35 U.S.C. 154(b) by 273 days.

(21) Appl. No.: 13/842,258

(22) Filed: Mar. 15, 2013

(65) Prior Publication Data

US 2013/0215266 A1    Aug. 22, 2013

Related U.S. Application Data

(63) Continuation-in-part of application No. 12/893,162, filed on Sep. 29, 2010, now Pat. No. 8,675,066.

(60) Provisional application No. 61/248,263, filed on Oct. 2, 2009.

(51) Int. Cl.
*H04N 7/18* (2006.01)
*G08B 13/196* (2006.01)
*G08B 25/00* (2006.01)
*G08B 29/04* (2006.01)

(52) U.S. Cl.
CPC ............ *H04N 7/18* (2013.01); *G08B 13/19602* (2013.01); *G08B 13/19695* (2013.01); *G08B 13/1966* (2013.01); *G08B 13/19667* (2013.01); *G08B 25/008* (2013.01); *G08B 29/046* (2013.01)

(58) Field of Classification Search
CPC ........................... H04N 7/18; G08B 13/19602
See application file for complete search history.

(56) References Cited

U.S. PATENT DOCUMENTS

| | | | | |
|---|---|---|---|---|
| 5,317,620 | A * | 5/1994 | Smith | 379/40 |
| 5,650,814 | A | 7/1997 | Florent et al. | |
| 6,078,253 | A * | 6/2000 | Fowler | 340/501 |
| 6,970,183 | B1 | 11/2005 | Monroe | |
| 7,471,334 | B1 * | 12/2008 | Stenger | 348/373 |

(Continued)

OTHER PUBLICATIONS

U.S. Non-Final Office Action for U.S. Appl. No. 12/893,162 dated Jul. 23, 2013, 29 pages.

(Continued)

*Primary Examiner* — Joseph Ustaris
*Assistant Examiner* — Zhubing Ren

(57) ABSTRACT

Image surveillance and reporting technology, in which an event that is indicative of potential physical activity within an area corresponding to a location of a camera unit is detected. In response to detection of the event, the camera unit is controlled to capture one or more images of the area corresponding to the location of the camera unit. The one or more images captured by the camera unit are analyzed to determine whether the one or more images include image data that is indicative of relevant physical activity within the area corresponding to the location of the camera unit. The one or more images are handled based on the determination of whether the one or more images include image data that is indicative of relevant physical activity within the area corresponding to the location of the camera unit.

20 Claims, 11 Drawing Sheets

(56) References Cited

U.S. PATENT DOCUMENTS

| | | |
|---|---|---|
| 7,555,383 B2 | 6/2009 | Siegel |
| 7,688,255 B2 | 3/2010 | Suzuki et al. |
| 2004/0143602 A1 | 7/2004 | Ruiz et al. |
| 2004/0184676 A1 | 9/2004 | Chapman |
| 2005/0036450 A1* | 2/2005 | Arimori et al. ............... 370/235 |
| 2005/0111696 A1 | 5/2005 | Baer |
| 2005/0226463 A1 | 10/2005 | Suzuki et al. |
| 2007/0024707 A1 | 2/2007 | Brodsky |
| 2007/0262857 A1 | 11/2007 | Jackson |
| 2008/0198231 A1 | 8/2008 | Ozdemir et al. |
| 2009/0096871 A1 | 4/2009 | Kuwano et al. |
| 2009/0216876 A1 | 8/2009 | Hsieh et al. |

OTHER PUBLICATIONS

International Search Report in Application No. PCT/US10/51350, mailed Dec. 13, 2010, 12 pages.

U.S. Non-Final Office Action for U.S. Appl. No. 12/893,162 dated Nov. 23, 2012, 26 pages.

U.S. Final Office Action for U.S. Appl. No. 12/893,162 dated Apr. 8, 2013, 27 pages.

* cited by examiner

610

620

630

IMAGE SURVEILLANCE AND REPORTING TECHNOLOGY

CROSS REFERENCE TO RELATED APPLICATIONS

The present application is a continuation-in-part of U.S. application Ser. No. 12/893,162, filed Sep. 29, 2010, which claims the benefit of U.S. Provisional Application No. 61/248,263, filed Oct. 2, 2009, each of which is incorporated herein by reference in its entirety for all purposes.

TECHNICAL FIELD

This disclosure relates to image surveillance and reporting technology.

BACKGROUND

Many people equip homes and businesses with alarm systems to provide increased security for their homes and businesses. Alarm systems may include control panels that a person may use to control operation of the alarm system and sensors that monitor for security breaches. In response to an alarm system detecting a security breach, the alarm system may generate an audible alert and, if the alarm system is monitored by a monitoring service, the alarm system may send electronic data to the monitoring service to alert the monitoring service of the security breach.

SUMMARY

Techniques are described for image surveillance and reporting technology.

In one aspect, a monitoring system includes a camera unit configured to capture images of an area corresponding to a location of the camera unit and a remote monitoring server that is located remote from the camera unit and that is configured to process image data captured by camera units associated with multiple, different customers of a monitoring company. The monitoring system also includes a gateway that is configured to communicate with the camera unit using a short range wireless protocol and that is configured to communicate, over a network, with the remote monitoring server. The monitoring system further includes at least one processor configured to perform operations. The operations includes detecting an event that is indicative of potential physical activity within the area corresponding to the location of the camera unit and, in response to detection of the event that is indicative of potential physical activity within the area corresponding to the location of the camera unit, controlling the camera unit to capture one or more images of the area corresponding to the location of the camera unit. In addition, the operations include analyzing the one or more images captured by the camera unit to determine whether the one or more images captured by the camera unit include image data that is indicative of relevant physical activity within the area corresponding to the location of the camera unit and handling the one or more images captured by the camera unit based on the determination of whether the one or more images captured by the camera unit include image data that is indicative of relevant physical activity within the area corresponding to the location of the camera unit.

Implementations may include one or more of the following features. For example, the at least one processor may include a processor embedded in the camera unit and the processor embedded in the camera unit may be configured to perform the detecting, the controlling, the analyzing, and the handling. Further, in some implementations, the camera unit may include a motion sensor that is configured to detect motion in the area corresponding to the location of the camera unit and the operations may include detecting motion in the area corresponding to the location of the camera unit based on output from the motion sensor included in the camera unit. In these implementations, the camera unit may include a passive InfraRed sensor that is configured to measure InfraRed light radiating from objects in the area corresponding to the location of the camera unit and the operations may include detecting motion in the area corresponding to the location of the camera unit based on output from the passive InfraRed sensor.

In some examples, the gateway may be included in a security system control panel, the at least one processor may include a processor included in the security system control panel, and the processor included in the security system control panel may be configured to perform the detecting, the controlling, the analyzing, and the handling. In addition, the camera unit may be located within a property monitored by a security system that includes a security system control panel and security system sensors that are configured to sense events related to security of the monitored property, the remote monitoring server may be located remote from the monitored property, and the gateway may be included in the security system control panel that communicates with the security system sensors that are configured to sense events related to security of the monitored property. The operations may include detecting activity in the monitored property based on one or more events sensed by the security system sensors.

In some implementations, the operations may include extracting a subset of image data from each of the one or more images captured by the camera unit, comparing the extracted subset of image data from each of the one or more images captured by the camera unit to image data from a reference image captured by the camera unit, and detecting portions of each of the one or more images captured by the camera unit that have a threshold difference from a corresponding portion of the reference image. In these implementations, the operations may include determining whether each of the one or more images captured by the camera unit includes image data that is indicative of relevant physical activity within the area corresponding to the location of the camera unit based on the detected portions of each of the one or more images captured by the camera unit that have a threshold difference from a corresponding portion of the reference image. Also, in these implementations, the operations may include extracting luminance data from each of the one or more images captured by the camera unit and comparing the extracted luminance data from each of the one or more images captured by the camera unit to luminance data from a reference image captured by the camera unit. Further, in these implementations, the operations may include detecting pixels within each of the one or more images captured by the camera unit that have a threshold difference from a corresponding pixel within the reference image, determining a number of pixels within each of the one or more images captured by the camera unit detected as having a threshold difference from a corresponding pixel within the reference image, and determining whether each of the one or more images captured by the camera unit include image data that is indicative of relevant physical activity within the area corresponding to the location of the camera unit based on the determined number of pixels within each of the one or more images captured by the camera unit detected as having a threshold difference from a corresponding pixel within the reference image.

The operations may include detecting pixels within each of the one or more images captured by the camera unit that have a threshold difference from a corresponding pixel within the reference image, analyzing a shape of the pixels within each of the one or more images captured by the camera unit detected as having a threshold difference from a corresponding pixel within the reference image, and determining whether each of the one or more images captured by the camera unit include image data that is indicative of relevant physical activity within the area corresponding to the location of the camera unit based on the analysis of the shape of the pixels within each of the one or more images captured by the camera unit detected as having a threshold difference from a corresponding pixel within the reference image. The camera unit may include an illumination sensor that is configured to sense a level of light in the area corresponding to the location of the camera unit and the operations may include determining whether to control the camera unit to capture a new reference image based on the level of light in the area corresponding to the location of the camera unit sensed by the illumination sensor.

In some examples, the operations may include determining a time of day corresponding to capture of the one or more images captured by the camera unit and selecting, from among multiple, different reference images that each correspond to a particular time of day, a particular reference image that corresponds to the determined time of day. In these examples, the operations may include comparing the extracted subset of image data from each of the one or more images captured by the camera unit to image data from the particular reference image that corresponds to the determined time of day. In addition, the operations may include discarding the one or more images captured by the camera unit based on a determination that the one or more images captured by the camera unit do not include image data that is indicative of relevant physical activity within the area corresponding to the location of the camera unit.

In some implementations, the operations may include transmitting, from the camera unit to the gateway, the one or more images captured by the camera unit based on a determination that the one or more images captured by the camera unit include image data that is indicative of relevant physical activity within the area corresponding to the location of the camera unit. In these implementations, the operations may include, based on a determination that the one or more images captured by the camera unit include image data that is indicative of relevant physical activity within the area corresponding to the location of the camera unit, accessing one or more rules that control whether the one or more images captured by the camera unit are transmitted from the gateway to the remote monitoring server and determining whether to transmit the one or more images captured by the camera unit from the gateway to the remote monitoring server based on application of the accessed one or more rules. Based on a determination to transmit the one or more images captured by the camera unit from the gateway to the remote monitoring server, the one or more images captured by the camera unit may be transmitted from the gateway to the remote monitoring server.

Further, the operations may include accessing one or more security system rules that control whether the one or more images captured by the camera unit are transmitted from the gateway to the remote monitoring server based on one or more events detected by a security system that monitors a property associated with the area corresponding to the location of the camera unit and monitoring for events detected by the security system that monitors the property associated with the area corresponding to the location of the camera unit. Based on the monitoring, events detected by the security system may be compared to the one or more security system rules and a determination may be made as to whether to transmit the one or more images captured by the camera unit from the gateway to the remote monitoring server based on the comparison of the events detected by the security system to the one or more security system rules.

In addition, the operations may include accessing one or more user-defined rules that control whether the one or more images captured by the camera unit are transmitted from the gateway to the remote monitoring server based on a number of images that have been transmitted from the gateway to the remote monitoring server within a particular period of time and determining the number of images that have been transmitted from the gateway to the remote monitoring server within the particular period of time. The operations also may include comparing the determined number of images that have been transmitted from the gateway to the remote monitoring server within the particular period of time to the one or more user-defined rules and determining whether to transmit the one or more images captured by the camera unit from the gateway to the remote monitoring server based on the comparison of the determined number of images that have been transmitted from the gateway to the remote monitoring server within the particular period of time to the one or more user-defined rules.

In some examples, the operations may include, based on a determination not to transmit the one or more images captured by the camera unit from the gateway to the remote monitoring server, determining whether to discard the one or more images captured by the camera unit based on application of the accessed one or more rules. In these examples, the operations may include discarding, at the gateway, the one or more images captured by the camera unit without transmitting the one or more images captured by the camera unit to the remote monitoring server in response to a determination to discard the one or more images captured by the camera unit based on application of the accessed one or more rules. Further, in these examples, the operations may include maintaining, in memory associated with the gateway, the one or more images captured by the camera unit and continuing to monitor for events that impact application of the accessed one or more rules in response to a determination not to discard the one or more images captured by the camera unit based on application of the accessed one or more rules.

In another aspect, a method includes detecting an event that is indicative of potential physical activity within an area corresponding to a location of a camera unit configured to capture images of the area corresponding to the location of the camera unit and, in response to detection of the event that is indicative of potential physical activity within the area corresponding to the location of the camera unit, controlling the camera unit to capture one or more images of the area corresponding to the location of the camera unit. The method also includes analyzing the one or more images captured by the camera unit to determine whether the one or more images captured by the camera unit include image data that is indicative of relevant physical activity within the area corresponding to the location of the camera unit and handling the one or more images captured by the camera unit based on the determination of whether the one or more images captured by the camera unit include image data that is indicative of relevant physical activity within the area corresponding to the location of the camera unit.

In yet another aspect, at least one computer-readable storage medium is encoded with executable instructions that, when executed by at least one processor, cause the at least one processor to perform operations. The operations include detecting an event that is indicative of potential physical activity within an area corresponding to a location of a camera unit configured to capture images of the area corresponding to the location of the camera unit and, in response to detection of the event that is indicative of potential physical activity within the area corresponding to the location of the camera unit, controlling the camera unit to capture one or more images of the area corresponding to the location of the camera unit. The operations also include analyzing the one or more images captured by the camera unit to determine whether the one or more images captured by the camera unit include image data that is indicative of relevant physical activity within the area corresponding to the location of the camera unit and handling the one or more images captured by the camera unit based on the determination of whether the one or more images captured by the camera unit include image data that is indicative of relevant physical activity within the area corresponding to the location of the camera unit.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Techniques are described for providing visual surveillance and reporting using a system that monitors a building (e.g., a home alarm system). In some implementations, broadband Internet connections may not be available or may be complex to configure for the system. In these implementations, the system may capture static images, rather than motion-video, of activity on a customer property being monitored by the system. The static images may be transmitted over relatively expensive network connections (e.g., cellular and/or satellite) more affordably than transmitting live or recorded video. The system may use the static images to provide cost-effective solutions for visual surveillance and reporting.

In some examples, a service provides images of activity at a user's property. The service may include a "local system" component comprised of a controller and one or more cameras that capture digital images of an area when activity is detected in the area. The controller may be integrated with an intrusion security system and leverage information observed by the intrusion security system (e.g., the alarm system state, such as armed/disarmed, in alarm, etc.) in controlling the one or more cameras that capture digital images. The service also may include a customer portal that provides customer access to the images captured by the one or more cameras.

Figure 1:
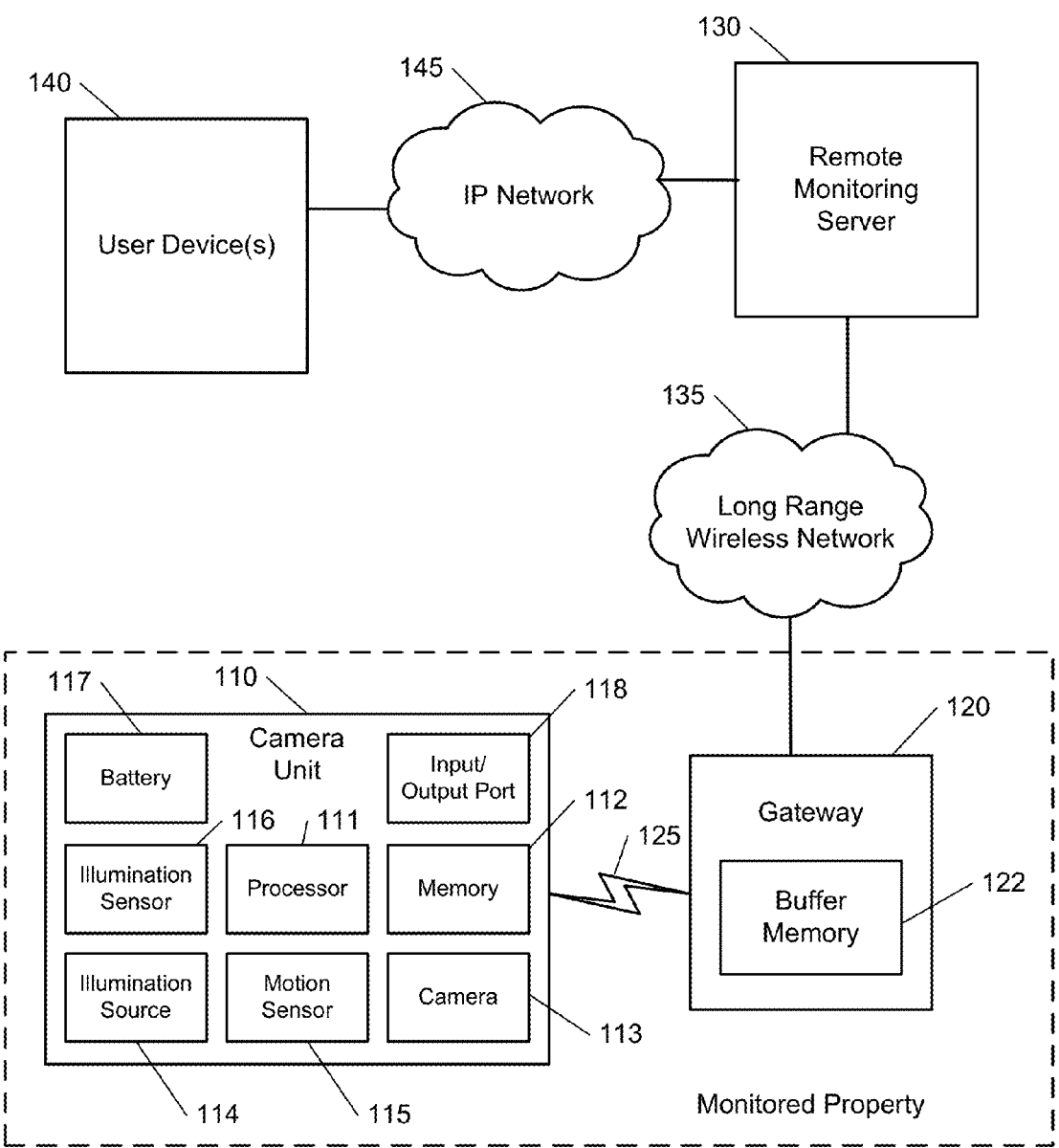
FIGS. 1 and 2 illustrate example systems.

FIG. 1 illustrates an example of an electronic system 100 configured to provide image surveillance and reporting. The system 100 includes a camera unit 110, a gateway 120, a remote monitoring server 130, and one or more user devices 140. The camera unit 110 is a relatively small and affordable unit that captures still images of an area that corresponds to a location of the camera unit. Because the camera unit 110 is relatively small, runs off of battery power, and communicates via a wireless communication protocol, the camera unit 110 may be easily placed at any location within a monitored property (or just outside of a monitored property) to provide image surveillance of an area of the monitored property (or an area just outside of the monitored property).

The camera unit 110 includes a processor 111, a memory 112, a camera 113, an illumination source 114, a motion sensor 115, an illumination sensor 116, a battery 117, and an input/output port 118. The processor 111 controls operations of the camera unit 110 and may be any suitable processor. The memory 112 stores instructions that are executed by the processor 111 and also stores images captured by the camera 113. The memory 112 may be any type of memory that is capable storing data and may include a combination of multiple, memory units. For example, the memory 112 may be a Flash memory component that stores both instructions that are executed by the processor and images captured by the camera 113.

The camera 113 captures images of an area proximate to where the camera unit is located. For instance, the camera 113 may be placed at an upper corner of a room in a building and, in this instance, the camera 113 captures images of the room. The camera 113 may be a video/photographic camera or other type of optical sensing device configured to capture images. In some implementations, the camera 113 is a CMOS camera sensor (or other CCD sensor) that captures images at various, different resolutions. For instance, the CMOS camera sensor may capture up to 640×480 pixels (e.g., VGA resolution). The camera 113 also may capture a lower resolution image (e.g., Quarter VGA=QVGA=320×240 pixels).

The illumination source 114 may be any source of illumination that improves capturing of images in a dark area. For example, the illumination source 114 may include one or more Infra Red LEDs that emit Infra Red light over an area within a field of view of the camera 113 to illuminate objects within the area. The processor 111 may control the illumination source 114 to emit light when the illumination sensor 116 detects a level of light that is below a threshold level.

The motion sensor 115 may be Passive Infra Red (PIR) motion sensor, a microwave motion sensor, or any type of sensor that detects motion in an area corresponding to a field of view of the camera 113. The processor 111 may monitor output of the motion sensor 115 and trigger the camera 113 to capture images in response to the motion sensor 115 detecting motion in the area corresponding to the field of view of the camera 113.

The battery 117 is the power source of the camera unit 110 and may be any type of battery capable of delivering power to the camera unit 110. The battery 117 may have a relatively small size and may be a standard type of battery available for purchase at retail stores. The battery 117 may be located in a compartment that is easily accessible to a user of the camera unit 110 to facilitate changing of the battery 117, which may occur relatively frequently (e.g., every couple of months) depending on the power consumption and image capture settings of the camera unit 110.

The input/output port 118 is a communication interface through which the camera unit may send and receive wireless communications. The input/output port 118 may, using a short range wireless protocol (e.g., Bluetooth, Z-Wave, ZigBee, local wireless 900 MHz communication band, etc.), receive and send short range wireless communications with other devices, such as the gateway 120. The input/output port 118 may include a "normally open" or "normally closed" digital input that can trigger capture of images using the camera 113.

To reduce processing power needed and to conserve battery life, the processor 111 may control components of the camera unit 110 to periodically enter sleep mode operation. For example, the processor 111 may awaken every second to determine whether any communications have been received at the input/output port 118. If no communications have been received, the processor 111 may place itself and other components (e.g., the memory 112, the camera 113, etc.) in a sleep mode for another second before awaking again to determine whether any communications have been received at the input/output port 118. The processor 111 also may awaken from a sleep mode state based on output from the motion sensor 115 indicating that motion has been detected.

In some implementations, the processor 111 of the camera unit 110 conserves battery power and costs of data transmission by analyzing reduced resolution versions of images captured by the camera 113 for relevant or interesting activity before sending the images to the gateway 120. In these implementations, the processor 111 may wait for an event detected by the motion sensor 115 and, in response to the event, control the camera 113 to capture a full resolution image (e.g., VGA resolution at 640×480 pixels). The processor 111 then extracts reduced resolution luminance data from the full resolution image (e.g., 80×60 pixels for 4800 data points) and searches the reduced resolution luminance data for motion that is limited roughly to a quarter of the total image area. If the processor 111 finds motion that is limited roughly to a quarter of the total image area, the processor 111 extracts the QVGA region from the original, full resolution VGA image and sends only that portion to the gateway 120. If the processor 111 does not find motion that is limited roughly to a quarter of the total image area, the processor 111 analyzes any motion within the total image area to determine whether the motion is indicative or relevant/interesting activity. If the processor 111 determines that the motion is indicative or relevant/interesting activity, the processor 111 sends the QVGA version of the full image to the gateway 120. If the processor 111 determines that no motion exists or the motion is not indicative or relevant/interesting activity, the processor 111 discards the image without transmitting it to the gateway 120.

In some examples, the camera unit 110 offers plug and play installation, where the gateway 120 dynamically discovers the camera unit 110 and begins interacting with the camera unit 110. The camera unit 110 also may be controlled locally through a local control input device (e.g., an on/off button or a capture image button) or a gesture. For instance, a user may perform a gesture in front of the camera unit 110 to control the camera unit 110 to enter an off state in which images are not captured.

In some implementations, the camera unit 110 may include tamper alert mechanisms. In these implementations, the camera unit 110 may analyze images captured by the camera unit 110 to determine whether the camera has been covered. For instance, the camera unit 110 may detect covering when several captured images are completely dark (or entirely a single color) when the illumination sensor 116 indicates that the area within the field of view of the camera 113 is illuminated or the illumination source 114 was used when the images were captured. Further, the camera unit 110 may include an accelerometer that detects movement of the camera unit 110 or may detect movement of the camera unit 110 based on images captured by the camera unit 110. The camera unit 110 may send an alert to the gateway 120 when the camera unit 110 detects covering or movement and the gateway 120 may relay the alert to the remote monitoring server 130 so that action to address the potential tampering can be taken.

The gateway 120 is a communication device configured to exchange short range wireless communications with the camera unit 110 over the communication link 125 and long range wireless communications with the remote monitoring server 130 over the network 135. Because the gateway 120 exchanges short range wireless communications with the camera unit 110, the gateway 120 is positioned nearby the camera unit 110. As shown in FIG. 1, the gateway 120 and the camera unit 110 are both located within a monitored property that is remote (and may be very far away from) the remote monitoring server 130.

In some examples, the gateway 120 may include a wireless communication device configured to exchange long range communications over a wireless data channel. In this example, the gateway 120 may transmit header data and image data over a wireless data channel. The gateway 120 may include one or more of a GSM module, a radio modem, cellular transmission module, or any type of module configured to exchange communications in one of the following formats: GSM or GPRS, CDMA, EDGE or EGPRS, EV-DO or EVDO, or UMTS.

The gateway 120 includes a buffer memory 122 that stores image data captured by the camera unit 110. The buffer memory 122 may temporarily store image data captured by the camera unit 110 to delay a decision of whether the image data (or a subset of the image data) is worthwhile to send to the remote monitoring server 130. The buffer memory 122 may be larger than the memory 112 of the camera unit 110 and, because the gateway 120 operates using an AC power source, using the buffer memory 122 to store images captured by the camera unit 110 may be more efficient. The gateway 120 also may include a display with which the stored images may be displayed to a user.

The long range wireless network 135 enables wireless communication between the gateway 120 and the remote monitoring server 130. The long range wireless network 135 may be any type of cellular network and may support any one or more of the following protocols: GSM or GPRS, CDMA, EDGE or EGPRS, EV-DO or EVDO, or UMTS. It may be relatively expensive to transmit data over the long range wireless network 135 and, therefore, the camera unit 110 and the gateway 120 may be selective in the image data transmitted to the remote monitoring server 130.

The remote monitoring server 130 receives image data from the gateway 120 over the long range wireless network 135. The remote monitoring server 130 stores the received image data and makes the image data available to one or more user devices 140 over the IP-based network 145. For instance, the remote monitoring server 130 may make the image data available to the one or more user devices 140 at a website accessible by the one or more user devices 140 over the Internet. The remote monitoring server 130 also may make the image data available to the one or more user devices 140 in an electronic message, such as an electronic mail message.

In some implementations, the remote monitoring server 130 receives the image data from the gateway 120 as a reference image and a series of differential images that indicate the difference between the corresponding image and the reference image. In these implementations, header information sent with the image data indicates which images are reference images, which images are differential images, and which reference image each differential image corresponds to. The remote monitoring server 130 processes the reference image and the differential images and converts each image into a standard image format, such as JPEG. The remote monitoring server 130 then stores the converted images in a database or a file system and makes the converted images available to the one or more user devices 140.

Figure 2:
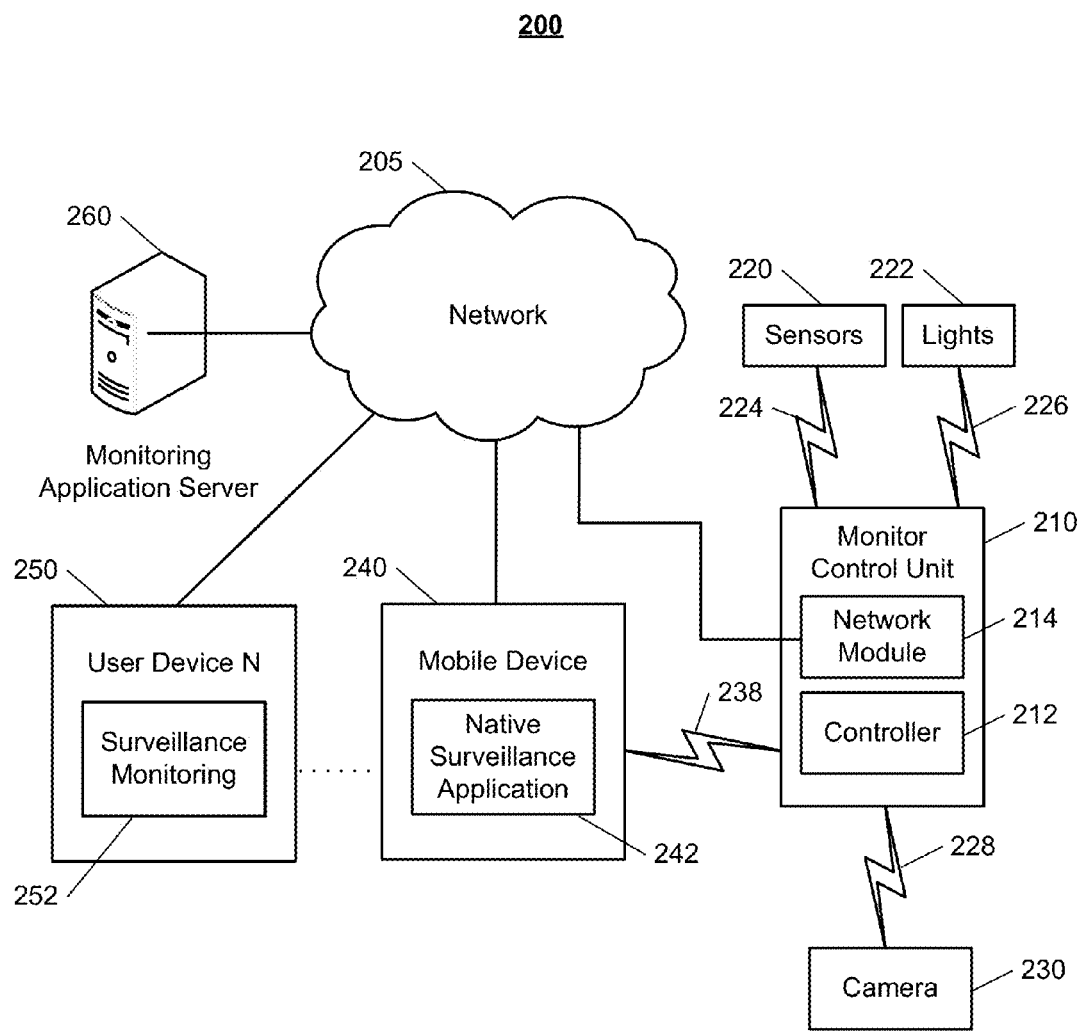

FIG. 2 illustrates an example of an electronic system 200 configured to provide visual surveillance and reporting. The electronic system 200 includes a network 205, a monitoring system control unit 210, one or more user devices 240, 250, and a monitoring application server 260. In some examples, the network 205 facilitates communications between the monitoring system control unit 210, the one or more user devices 240, 250, and the monitoring application server 260.

The network 205 is configured to enable exchange of electronic communications between devices connected to the network 205. For example, the network 205 may be configured to enable exchange of electronic communications between the monitoring system control unit 210, the one or more user devices 240, 250, and the monitoring application server 260. The network 205 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 205 may include multiple networks or subnetworks, each of which may include, for example, a wired or wireless data pathway. The network 205 may include a circuit-switched network, a packet-switched data network, or any other network able to carry electronic communications (e.g., data or voice communications). For example, the network 205 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 205 may include one or more networks that include wireless data channels and wireless voice channels. The network 205 may be a wireless network, a broadband network, or a combination of networks including a wireless network and a broadband network.

The monitoring system control unit 210 includes a controller 212 and a network module 214. The controller 212 is configured to control a monitoring system (e.g., a home alarm or security system) that includes the monitoring system control unit 210. In some examples, the controller 212 may include a processor or other control circuitry configured to execute instructions of a program that controls operation of an alarm system. In these examples, the controller 212 may be configured to receive input from sensors, detectors, or other devices included in the alarm system and control operations of devices included in the alarm system or other household devices (e.g., a thermostat, an appliance, lights, etc.). For example, the controller 212 may be configured to control operation of the network module 214 included in the monitoring system control unit 210.

The network module 214 is a communication device configured to exchange communications over the network 205. The network module 214 may be a wireless communication module configured to exchange wireless communications over the network 205. For example, the network module 214 may be a wireless communication device configured to exchange communications over a wireless data channel and a wireless voice channel. In this example, the network module 214 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: GSM or GPRS, CDMA, EDGE or EGPRS, EV-DO or EVDO, UMTS, or IP.

The network module 214 also may be a wired communication module configured to exchange communications over the network 205 using a wired connection. For instance, the network module 214 may be a modem, a network interface card, or another type of network interface device. The network module 214 may be an Ethernet network card configured to enable the monitoring system control unit 210 to communicate over a local area network and/or the Internet. The network module 214 also may be a voiceband modem configured to enable the alarm panel to communicate over the telephone lines of Plain Old Telephone Systems (POTS).

The monitoring system that includes the monitoring system control unit 210 includes one or more sensors or detectors. For example, the monitoring system may include multiple sensors 220. The sensors 220 may include a contact sensor, a motion sensor, a glass break sensor, or any other type of sensor included in an alarm system or security system. The sensors 220 also may include an environmental sensor, such as a temperature sensor, a water sensor, a rain sensor, a wind sensor, a light sensor, a smoke detector, a carbon monoxide detector, an air quality sensor, etc. The sensors 220 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 220 may include a radio-frequency identification (RFID) sensor that identifies a particular article that includes a pre-assigned RFID tag.

The monitoring system control unit 210 communicates with the module 222 and the camera 230 to perform visual surveillance or monitoring. The module 222 is connected to one or more lighting systems and is configured to control operation of the one or more lighting systems. The module 222 may control the one or more lighting systems based on commands received from the monitoring system control unit 210. For instance, the module 222 may cause a lighting system to illuminate an area to provide a better image of the area when captured by a camera 230.

The camera 230 may be a video/photographic camera or other type of optical sensing device configured to capture images. For instance, the camera 230 may be configured to capture images of an area within a building monitoring by the monitoring system control unit 210. The camera 230 may be configured to capture single, static images of the area and also video images of the area in which multiple images of the area are captured at a relatively high frequency (e.g., thirty images per second). The camera 230 may be controlled based on commands received from the monitoring system control unit 210.

The camera 230 may be triggered by several different types of techniques. For instance, a Passive Infra Red (PIR) motion sensor may be built into the camera 230 and used to trigger the camera 230 to capture one or more images when motion is detected. The camera 230 also may include a microwave motion sensor built into the camera and used to trigger the camera 230 to capture one or more images when motion is detected. The camera 230 may have a "normally open" or "normally closed" digital input that can trigger capture of one or more images when external sensors (e.g., the sensors 220, PIR, door/window, etc.) detect motion or other events. In some implementations, the camera 230 receives a software command to capture an image when external devices detect motion. The camera 230 may receive the software command from the controller 212 or directly from one of the sensors 220.

In some examples, the camera 230 triggers integrated or external illuminators (e.g., Infra Red, Z-wave controlled "white" lights, lights controlled by the module 222, etc.) to improve image quality when the scene is dark. An integrated or separate light sensor may be used to determine if illumination is desired and may result in increased image quality.

The camera 230 may be programmed with any combination of time/day schedules, system "arming state", or other variables to determine whether images should be captured or not when triggers occur. The camera 230 may enter a low-power mode when not capturing images. In this case, the camera 230 may wake periodically to check for inbound messages from the controller 212. The camera 230 may be powered by internal, replaceable batteries if located remotely from the monitoring control unit 210. The camera 230 may employ a small solar cell to recharge the battery when light is available. Alternatively, the camera 230 may be powered by the controller's 212 power supply if the camera 230 is collocated with the controller 212.

The sensors 220, the module 222, and the camera 230 communicate with the controller 212 over communication links 224, 226, and 228. The communication links 224, 226, and 228 may be a wired or wireless data pathway configured to transmit signals from the sensors 220, the module 222, and the camera 230 to the controller 212. The sensors 220, the module 222, and the camera 230 may continuously transmit sensed values to the controller 212, periodically transmit sensed values to the controller 212, or transmit sensed values to the controller 212 in response to a change in a sensed value.

The communication link 228 over which the camera 230 and the controller 212 communicate may include a local network. The camera 230 and the controller 212 may exchange images and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network.

The monitoring application server 260 is an electronic device configured to provide monitoring services by exchanging electronic communications with the monitoring system control unit 210 and the one or more user devices 240, 250 over the network 205. For example, the monitoring application server 260 may be configured to monitor events generated by the monitoring system control unit 210. In this example, the monitoring application server 260 may exchange electronic communications with the network module 214 included in the monitoring system control unit 210 to receive information regarding alarm events detected by the monitoring system control unit 210. The monitoring application server 260 also may receive information regarding events from the one or more user devices 240, 250.

The monitoring application server 260 may store sensor and image data received from the monitoring system and perform analysis of sensor and image data received from the monitoring system. Based on the analysis, the monitoring application server 260 may communicate with and control aspects of the monitoring system control unit 210 or the one or more user devices 240, 250.

The one or more user devices 240, 250 are devices that host and display user interfaces. For instance, the user device 240 is a mobile device that hosts one or more native applications (e.g., the native surveillance application 242). The user device 240 may be a cellular phone or a non-cellular locally networked device with a display. The user device 240 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 240 may perform functions unrelated to the monitoring system, such as placing personal telephone calls, playing music, playing video, displaying pictures, browsing the Internet, maintaining an electronic calendar, etc.

The user device 240 includes a native surveillance application 242. The native surveillance application 242 refers to a software/firmware program running on the corresponding mobile device that enables the user interface and features described throughout. The user device 240 may load or install the native surveillance application 242 based on data received over a network or data received from local media. The native surveillance application 242 runs on mobile devices platforms, such as iPhone, iPod touch, Blackberry, Google Android, Windows Mobile, etc. The native surveillance application 242 enables the user device 240 to receive and process image and sensor data from the monitoring system.

The user device 250 may be a general-purpose computer (e.g., a desktop personal computer, a workstation, or a laptop computer) that is configured to communicate with the monitoring application server 260 and/or the monitoring system control unit 210 over the network 205. The user device 250 may be configured to display a surveillance monitoring user interface 252 that is generated by the user device 250 or generated by the monitoring application server 260. For example, the user device 250 may be configured to display a user interface (e.g., a web page) provided by the monitoring application server 260 that enables a user to perceive images captured by the camera 230 and/or reports related to the monitoring system. Although FIG. 2 illustrates two user devices for brevity, actual implementations may include more (and, perhaps, many more) or fewer user devices.

In some implementations, the one or more user devices 240, 250 communicate with and receive monitoring system data from the monitoring system control unit 210 using the communication link 238. For instance, the one or more user devices 240, 250 may communicate with the monitoring system control unit 210 using various local wireless protocols such as wifi, Bluetooth, zwave, zigbee, HomePlug (ethernet over powerline), or wired protocols such as Ethernet and USB, to connect the one or more user devices 240, 250 to local security and automation equipment. The one or more user devices 240, 250 may connect locally to the monitoring system and its sensors and other devices. The local connection may improve the speed of status and control communications because communicating through the network 205 with a remote server (e.g., the monitoring application server 260) may be significantly slower.

Although the one or more user devices 240, 250 are shown as communicating with the monitoring system control unit 210, the one or more user devices 240, 250 may communicate directly with the sensors and other devices controlled by the monitoring system control unit 210. In some implementations, the one or more user devices 240, 250 replace the monitoring system control unit 210 and perform the functions of the monitoring system control unit 210 for local monitoring and long range/offsite communication.

In other implementations, the one or more user devices 240, 250 receive monitoring system data captured by the monitoring system control unit 210 through the network 205. The one or more user devices 240, 250 may receive the data from the monitoring system control unit 210 through the network 205 or the monitoring application server 260 may relay data received from the monitoring system control unit 210 to the one or more user devices 240, 250 through the network 205. In this regard, the monitoring application server 260 may facilitate communication between the one or more user devices 240, 250 and the monitoring system.

In some implementations, the one or more user devices 240, 250 may be configured to switch whether the one or more user devices 240, 250 communicate with the monitoring system control unit 210 directly (e.g., through link 238) or through the monitoring application server 260 (e.g., through network 205) based on a location of the one or more user devices 240, 250. For instance, when the one or more user devices 240, 250 are located close to the monitoring system control unit 210 and in range to communicate directly with the monitoring system control unit 210, the one or more user devices 240, 250 use direct communication. When the one or more user devices 240, 250 are located far from the monitoring system control unit 210 and not in range to communicate directly with the monitoring system control unit 210, the one or more user devices 240, 250 use communication through the monitoring application server 260.

Although the one or more user devices 240, 250 are shown as being connected to the network 205, in some implementations, the one or more user devices 240, 250 are not connected to the network 205. In these implementations, the one or more user devices 240, 250 communicate directly with one or more of the monitoring system components and no network (e.g., Internet) connection or reliance on remote servers is needed.

In some implementations, the one or more user devices 240, 250 are used in conjunction with only local sensors and/or local devices in a house. In these implementations, the system 200 only includes the one or more user devices 240, 250 and the sensors 220, the module 222, and the camera 230. The one or more user devices 240, 250 receive data directly from the sensors 220, the module 222, and the camera 230 and sends data directly to the sensors 220, the module 222, and the camera 230. The one or more user devices 240, 250 provide the appropriate interfaces/processing to provide visual surveillance and reporting.

In other implementations, the system 200 further includes network 205 and the sensors 220, the module 222, and the camera 230 are configured to communicate sensor and image data to the one or more user devices 240, 250 over network 205 (e.g., the Internet, cellular network, etc.). In yet another implementation, the sensors 220, the module 222, and the camera 230 (or a component, such as a bridge/router) are intelligent enough to change the communication pathway from a direct local pathway when the one or more user devices 240, 250 are in close physical proximity to the sensors 220, the module 222, and the camera 230 to a pathway over network 205 when the one or more user devices 240, 250 are farther from the sensors 220, the module 222, and the camera 230. In some examples, the system leverages GPS information from the one or more user devices 240, 250 to determine whether the one or more user devices 240, 250 are close enough to the sensors 220, the module 222, and the camera 230 to use the direct local pathway or whether the one or more user devices 240, 250 are far enough from the sensors 220, the module 222, and the camera 230 that the pathway over network 205 is required. In other examples, the system leverages status communications (e.g., pinging) between the one or more user devices 240, 250 and the sensors 220, the module 222, and the camera 230 to determine whether communication using the direct local pathway is possible. If communication using the direct local pathway is possible, the one or more user devices 240, 250 communicate with the sensors 220, the module 222, and the camera 230 using the direct local pathway. If communication using the direct local pathway is not possible, the one or more user devices 240, 250 communicate with the sensors 220, the module 222, and the camera 230 using the pathway over network 205.

In some implementations, the system 200 provides end users with access to images captured by the camera 230 to aid in decision making. The system 200 may transmit the images captured by the camera 230 over a wireless WAN network to the user devices 240, 250. Because transmission over a wireless WAN network may be relatively expensive, the system 200 uses several techniques to reduce costs while providing access to significant levels of useful visual information.

For instance, the system 200 may employ monitoring schedules to determine which periods of time when a recording device (e.g., the camera 230) will be active. The monitoring schedules may be set based on user input defining when users would like the recording device (e.g., the camera 230) to be active. The monitoring schedules also may be automatically set based on monitoring past activity related to the building being monitored by the monitoring system. For example, when the monitoring system is a home alarm system, the monitoring system may detect periods of time when users are typically at home and away from home and set monitoring schedules based on the detected periods of time. In this example, the monitoring system may set the recording device (e.g., the camera 230) to be active during time periods when users are detected as typically being away from home.

In some implementations, a state of the monitoring system and other events sensed by the monitoring system may be used to enable/disable video/image recording devices (e.g., the camera 230). In these implementations, the camera 230 may be set to capture images on a periodic basis when the alarm system is armed in an "Away" state, but set not to capture images when the alarm system is armed in a "Stay" state or disarmed. In addition, the camera 230 may be triggered to begin capturing images when the alarm system detects an event, such as an alarm event, a door opening event for a door that leads to an area within a field of view of the camera 230, or motion in the area within the field of view of the camera 230. In other implementations, the camera 230 may capture images continuously, but the captured images may be stored or transmitted over a network based on the monitoring schedules discussed above.

In some examples, full-resolution, uncompressed images captured by the camera 230 may be stored locally at the monitoring system. For instance, the full-resolution, uncompressed images may be saved in the camera 230 on non-volatile memory or by transmitting the full-resolution, uncompressed images to the controller 212 for storage in non-volatile memory associated with the monitoring system control unit 210. The stored images may be full quality JPEG images.

In examples in which full-resolution, uncompressed images are stored locally at the monitoring system, if an image is captured during a time period of interest, a reduced resolution and quality image may be sent from the local system to an end user device (e.g., the user device 240 or the user device 250) for initial display to the user. The user then may retrieve the higher quality image (or information sufficient to convert a reduced resolution image to a higher quality image) from the local system if desired.

In some implementations, users may choose to receive a text message (or other alert) or no notification at all (if real-time notification is not required) when images are recorded. When a user receives a text message (or other alert) that one or more images have been recorded, the user may enter a command to retrieve the one or more images if desired. The user may choose the number of images and/or the resolution of images received. In these implementations, a system history tracks the time and camera ID for recorded images and makes the system history available to users for later review of images.

In some examples, the number and/or quality of images transmitted from the protected property to the customer may be limited by processes that adjust certain variables to control the cost of transmitted data. The recording rates may continue unaffected or may be decreased by the processes. Variables that dictate the number and/or quality of images transmitted may include a maximum number of images transmitted per hour or day. For instance, a user may set the maximum number of images transmitted per hour or day and the system may stop transmitting images when the maximum number is reached. The system also may be controlled to wait a minimum time period between consecutive image transmissions. In this case, after transmitting a first image, the system may wait a threshold period of time prior to transmitting a second image, even if a monitoring schedule or detected event would otherwise suggest that an image should be transmitted.

The system also may apply increased compression, decreased resolution, or a longer delay between consecutive recordings to images from cameras with a recent history of excessive triggers. For instance, the system may monitor how frequently cameras are being triggered within the system and control individual cameras based on past triggering behavior for the corresponding camera. The system also may solicit and receive feedback from users related to the relevance of images captured by cameras that are being triggered at a relatively high rate. For instance, the system may receive feedback from users indicating whether the triggers are appropriate (e.g., the images captured are of relevant user activity) or false triggers (e.g., the images captured represent no activity or activity of something that is not desired to be monitored, such as a pet or a waving window curtain). The system may continue to capture and/or transmit images from an excessively triggering camera when the feedback reveals that the images are of relevant activity, but stop capturing and/or transmitting images from an excessively triggering camera when the feedback reveals that the images are of irrelevant activity.

In some implementations, transmission rules may require that multiple visual or non-visual (e.g. Passive Infra-Red motion detectors) sensors detect activity before an image is transmitted. In these implementations, the system may transmit an image when multiple sensors detect activity, but not when only a single sensor detects activity. For instance, the system may transmit an image when a Passive Infra-Red motion detector integrated in the camera 230 detects motion and one of the sensors 220 detects an event around the same time (e.g., within a threshold period of time before or after the motion is detected). The system may determine not to transmit an image when the Passive Infra-Red motion detector integrated in the camera 230 detects motion, but none of the sensors 220 detect an event.

In some examples, video analytics processes may be used to differentiate between non-security activity such as pet movement, sunlight coming through curtains, etc. and interesting activity such as human movement in the field of view. These processes may be implemented directly in the camera 230 or in the local controller 212 and may be used to determine whether images are transmitted. For instance, images of activity detected as being interesting are transmitted, whereas images of activity detected as being non-security activity are not transmitted.

Figure 3:
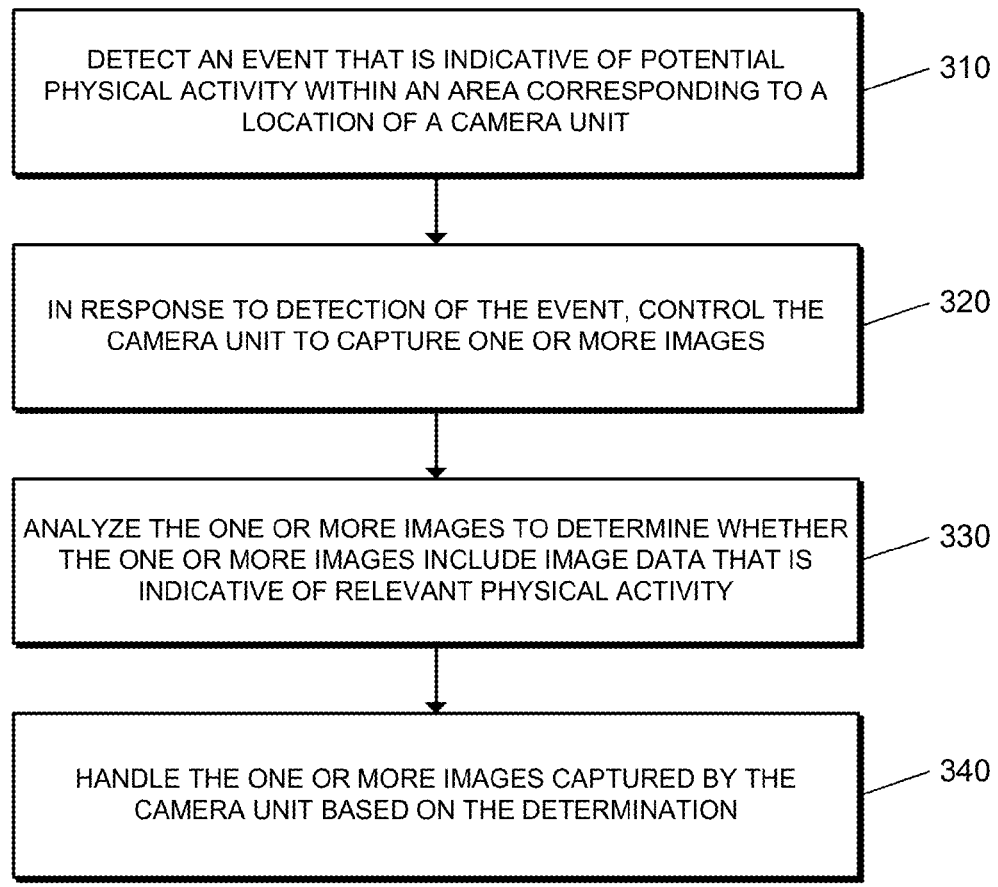
FIGS. 3, 5, and 7 are flow charts illustrating example processes.
Figure 5:
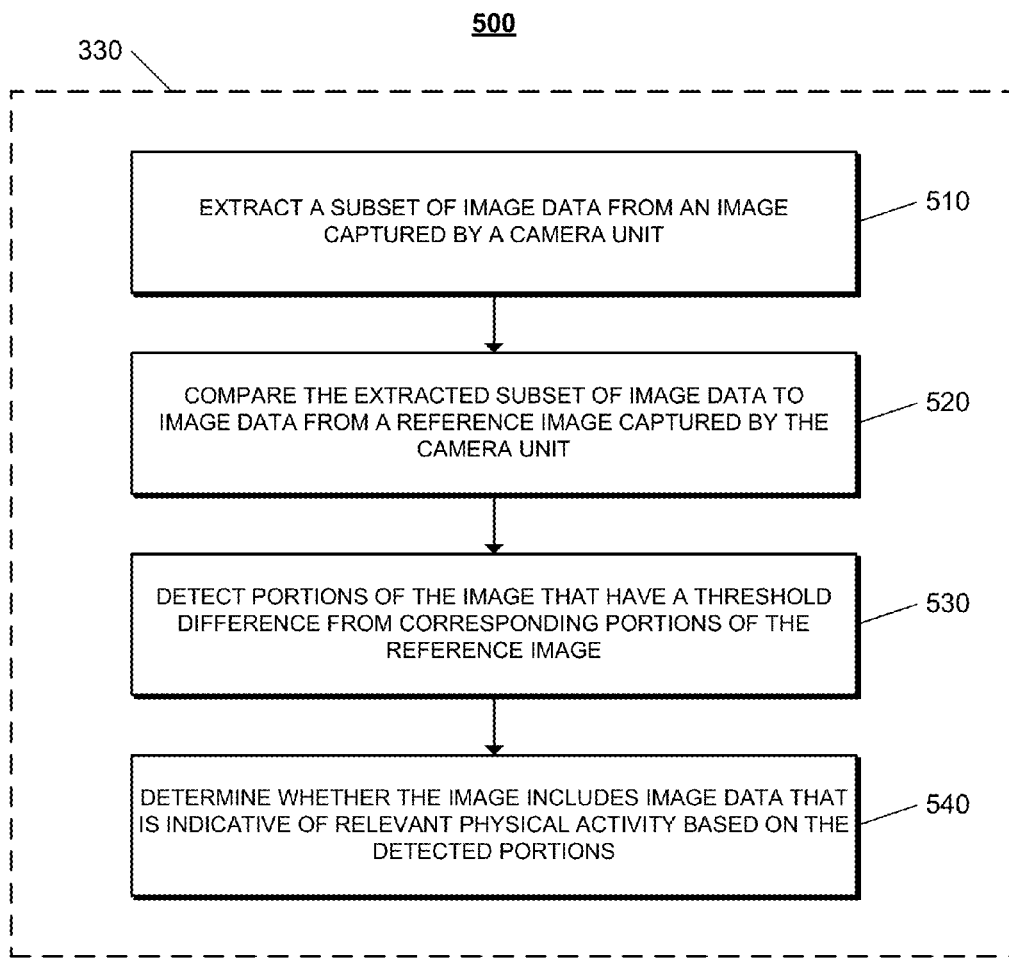
Figure 7:
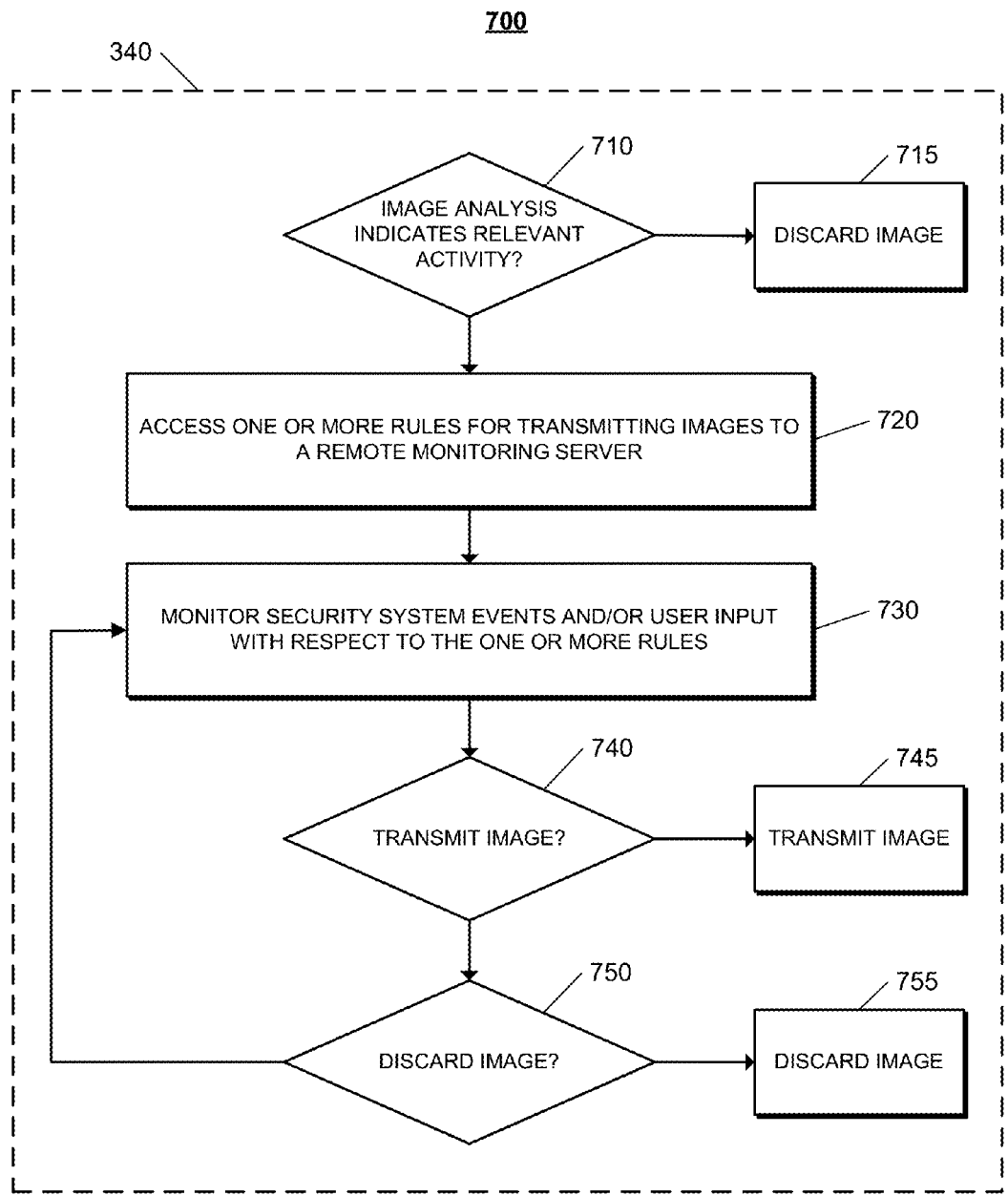

FIGS. 3, 5, and 7 illustrate example processes. The operations of the example processes are described generally as being performed by the system 100. The operations of the example processes may be performed by one of the components of the system 100 (e.g., the camera unit 110 or the gateway 120) or may be performed by any combination of the components of the system 100. In some examples, operations of the example processes may be performed by one of the components of the system 200 or may be performed by any combination of the components of the system 200. In some implementations, operations of the example processes may be performed by one or more processors included in one or more electronic devices.

FIG. 3 illustrates an example process 300 for handling images captured by a camera unit based on image analysis to determine whether the images include image data that is indicative of relevant physical activity. The system 100 detects an event that is indicative of potential physical activity within an area corresponding to a location of a camera unit (310). For example, the system 100 detects potential presence of a person in the area corresponding to the location of the camera unit based on output from one or more sensors. In this example, the system 100 may detect potential presence of a person in the area corresponding to the location of the camera unit based on output from a motion sensor (e.g., a PIR motion sensor) embedded in the camera unit.

The system 100 also may detect potential presence of a person in the area corresponding to the location of the camera unit based on output of one or more sensors of a security system that monitors the area corresponding to the location of the camera unit. For instance, the system 100 may detect a door sensor sensing that a door has been opened, a window sensor sensing that a window has been opened, and/or a motion sensor (e.g., another PIR motion sensor) detecting motion in the area corresponding to the location of the camera unit. Any combination of sensor events described throughout this disclosure may be used to detect potential presence of a person in the area corresponding to the location of the camera unit.

In some implementations, the system 100 requires detection of a combination of multiple events prior to detecting potential presence of a person in the area corresponding to the location of the camera unit. For example, the system 100 may require detection of entry into a property based on a door or window sensor and then detection of motion by a motion sensor (e.g., a PIR motion sensor) embedded in the camera unit before detecting an event that is indicative of potential physical activity within the area corresponding to the location of the camera unit. In this example, the system 100 does not detect an event that triggers the camera unit to capture images when the system 100 detects entry into the property based on the door or window sensor, but does not detect motion by the motion sensor embedded in the camera unit. Likewise, the system 100 does not detect an event that triggers the camera unit to capture images when the system 100 detects motion by the motion sensor embedded in the camera unit, but does not detect prior entry into the property based on the door or window sensor. In this regard, the system 100 only detects an event that triggers the camera unit to capture images when the system 100 detects entry into the property based on the door or window sensor and then detects motion by the motion sensor embedded in the camera unit.

In response to detection of the event, the system 100 controls the camera unit to capture one or more images (320). For example, a processor in the camera unit may detect the event and cause a camera in the camera unit to capture one or more images. In another example, a security system component (e.g., a security system control panel) may send a command to the camera unit that causes the camera in the camera unit to capture one or more images upon receipt.

Figure 4:
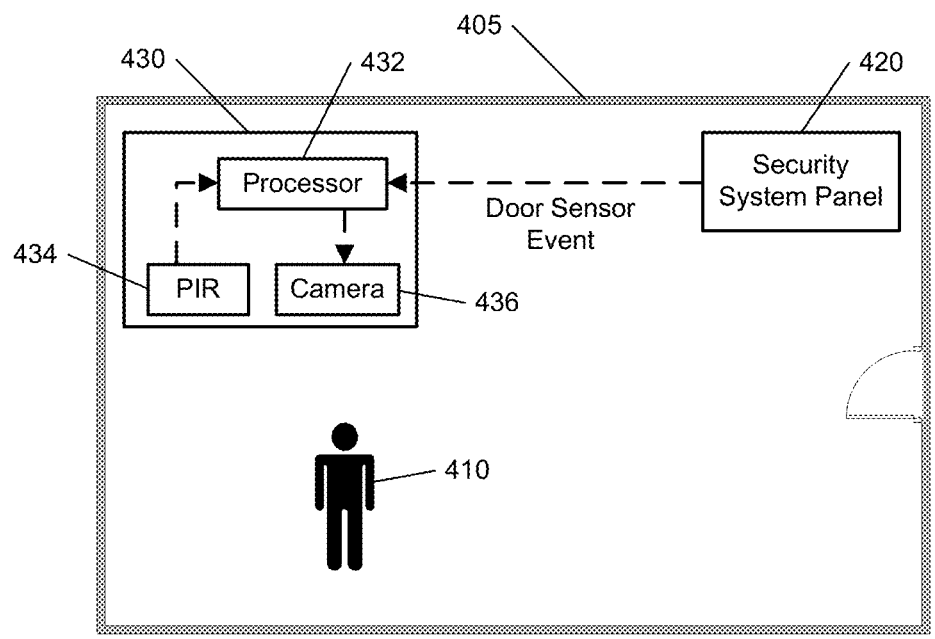
FIG. 4 illustrates an example of triggering a camera unit to capture images.

FIG. 4 illustrates an example of triggering a camera unit to capture images. As shown, a property 405 of a user 410 is monitored by a security system, which includes a security system panel 420. The property 405 also includes a camera unit 430 that communicates over a short range wireless protocol with the security system panel 420. The camera unit 430 includes a processor 432, a Passive Infra Red (PIR) motion sensor 434, and a camera 436.

In the example shown in FIG. 4, the user 410 enters the property 405 through a door and the security system panel 420 detects opening of the door based on output from a door sensor that senses whether the door is in an open or closed position. Based on detection of the door opening, the security system panel 420 sends a command to the camera unit 430. The command may indicate that a door opening has been detected or may simply be a command to control the camera unit 430 to perform an operation (e.g., a command to capture an image or a command to closely monitor the PIR motion sensor 434 with heightened sensitivity).

The PIR motion sensor 434 also detects motion in the property 405 based on the user 410 walking within an area corresponding to the location of the camera unit 430. The PIR motion sensor 434 provides output to the processor 432 indicating that motion has been detected.

The processor 432 processes the command sent by the security system panel 420 in response to detecting the door opening event and the output of the PIR motion sensor 434. For example, the processor 432 may control the camera 432 to capture a first image in response to receiving the command sent by the security system panel 420 in response to detecting the door opening event and control the camera 432 to capture a second image in response to the output of the PIR motion sensor 434 indicating that motion has been detected.

In another example, the processor 432 may more closely monitor output from the PIR motion sensor 434 with heightened sensitivity in response to receiving the command sent by the security system panel 420 in response to detecting the door opening event. For instance, the processor 432 may check the output of the PIR motion sensor 434 more frequently based on receiving the command sent by the security system panel 420 in response to detecting the door opening event and/or may lower the sensitivity threshold used to detect motion based on the output of the PIR motion sensor 434. Then, based on the output of the PIR motion sensor 434 indicating that motion has been detected, the processor 432 may control the camera 436 to capture one or more images. The processor 432 also may control the camera 436 to capture one or more images based on the combination of receiving the command sent by the security system panel 420 in response to detecting the door opening event and the output of the PIR motion sensor 434 indicating that motion has been detected.

Referring again to FIG. 3, the system 100 analyzes the one or more images to determine whether the one or more images include image data that is indicative of relevant physical activity (330). For example, the system 100 may process the one or more images to detect whether objects exist within the one or more images. When no objects exist in the one or more images, the system 100 determines that the one or more images do not include image data that is indicative of relevant physical activity. When objects exist in the one or more images, the system 100 may determine that the one or more images include image data that is indicative of relevant physical activity.

In some implementations, the system 100 analyzes a size and shape of detected objects to determine whether the detected objects are indicative of relevant physical activity. In these implementations, for example, the system 100 may compare the size and shape of the detected objects to a size and shape expected when a person is captured in the one or more images. When at least one of the detected objects has the size and shape expected when a person is captured in the one or more images, the system 100 determines that the one or more images include image data that is indicative of relevant physical activity. When none of the detected objects has the size and shape expected when a person is captured in the one or more images, the system 100 determines that the one or more images do not include image data that is indicative of relevant physical activity.

In some examples, the system 100 compares the one or more images to a reference image of a background scene captured by the camera unit. In these examples, the system 100 considers differences between the one or more images and the reference image to determine whether the one or more images include image data that is indicative of relevant physical activity. For instance, when the system 100 determines that no difference exists between the one or more images and the reference image, the system 100 determines that the one or more images do not include image data that is indicative of relevant physical activity.

When the system 100 determines that difference exists between the one or more images and the reference image, the system 100 analyzes the differences to determine whether the differences are significant. For example, the system 100 may analyze the number of differences, the level of difference, and the shape of the differences in determining whether the one or more images include image data that is indicative of relevant physical activity. In this example, when the system 100 detects small differences globally throughout an image, the system 100 determines that the image does not include image data that is indicative of relevant physical activity because the small differences are likely due to a background change, such as the sun going behind a cloud, rather than relevant physical activity in the location corresponding to the camera unit. Alternatively, when the system 100 detects large differences locally within an image, the system 100 determines that the image includes image data that is indicative of relevant physical activity because the large differences at a relatively small, localized portion of the image are likely caused by actual presence of an object in the location corresponding to the camera unit.

FIG. 5 illustrates an example process 500 for determining whether an image includes image data that is indicative of relevant physical activity. The process 500 may be performed in analyzing one or more images to determine whether the one or more images include image data that is indicative of relevant physical activity, as described with respect to reference numeral 330.

The system 100 extracts a subset of image data from an image captured by a camera unit (510). For example, the system 100 extracts reduced resolution image data from the image captured by the camera unit. In this example, the reduced resolution image data may only include luminance data for the image. The luminance data may include a single intensity value for each 8×8 pixel block within the image. The luminance data may be extracted from the captured image without decompression (or with less decompression).

In some implementations, the image captured by a camera unit may be an image with full VGA resolution of 640×480 pixels. In these implementations, the system 100 extracts reduced resolution luminance data of 80×60 pixels from the full VGA resolution image.

By extracting only the subset of image data from the image captured by the camera unit, the processing of the image data for relevant physical activity may be faster and more efficient. This may be particularly helpful when the image analysis is being performed by the camera unit because the camera unit has limitations in processing power, memory, and battery life. Accordingly, making the image analysis faster and more efficient may extend the battery life of the camera unit and may allow the limited processor of the camera unit to perform the image analysis in an acceptable time frame. In addition, a more sensitive PIR motion sensor may be used in the camera unit because the camera unit is able to quickly and efficiently detect images that do not include image data of relevant physical activity.

The system 100 compares the extracted subset of image data to image data from a reference image captured by the camera unit (520). For instance, the system 100 takes differences between pixels in the extracted subset of image data and corresponding pixels in a reference image that was captured by the camera unit that has the same type of image data as the extracted subset of image data. The reference image may be an image captured by the camera unit just prior to the image being processed. In this case, the system 100 may maintain a rolling reference image that represents a background scene just prior to the image under evaluation.

In some implementations, the system 100 may maintain one or more reference images in electronic storage. In these implementations, the system 100 may maintain a single reference image for each hour of the day and select the appropriate reference image to compare against the image under evaluation based on the time of day the image was captured. The stored reference images may represent an average of images captured at the particular time of day over the course of several days.

The system 100 also may compare a current background image (e.g., an image without relevant physical activity or motion) with a stored reference image. When the system 100 detects a large difference between the current background image and the stored reference image, the system 100 determines that a new reference image is needed and stores a new reference image. This may be helpful in detecting changes in the background of a scene, such as movement of a piece of furniture in the area within the field of view of the camera.

In some examples, the system 100 may maintain a single reference image in electronic storage. In these examples, the system 100 uses an illumination sensor to determine when a new reference image is needed. For instance, the system 100 may monitor a current level of light sensed by the illumination sensor with respect to a level of light sensed by the illumination sensor when the most recent reference image was captured. When the system 100 detects that the current level of light has reached a threshold difference from the level of light sensed by the illumination sensor when the most recent reference image was captured, the system 100 determines that a new reference image is needed and captures a new reference image. Accordingly, in these examples, the system 100 is able to maintain a single reference image that is appropriate for the current illumination of the area corresponding to the location of the camera.

The system 100 detects portions of the image that have a threshold difference from corresponding portions of the reference image (530). For example, the system 100 compares differences between pixels in the extracted subset of image data and corresponding pixels in the reference image to a threshold and, based on the comparison, detects pixels where more than a threshold difference exists.

The system 100 determines whether the image includes image data that is indicative of relevant physical activity based on the detected portions (540). For instance, the system 100 considers how many pixels have a threshold difference with respect to the reference image. When few pixels have a large difference, the system 100 determines that the image includes image data that is indicative of relevant physical activity. When many pixels have a small difference, the system 100 determines that the image does not include image data that is indicative of relevant physical activity.

In some implementations, the system 100 may analyze the connectivity of pixels that have a threshold difference. In these implementations, the system 100 determines that the image is more likely to include image data that is indicative of relevant physical activity when the detected pixels have a high degree of connectivity and determines that the image is less likely to include image data that is indicative of relevant physical activity when the detected pixels have a low degree of connectivity.

The system 100 also may analyze the shape or cluster of pixels that have a threshold difference. For instance, the system 100 may determine whether the shape or cluster is relatively large or relatively small and may determine whether the shape or cluster matches a shape of an object that likely represents relevant physical activity or, alternatively, matches a shape of an object that likely does not represent relevant physical activity.

In some examples, the system 100 may window into areas of the image where threshold differences have been detected. In these examples, the system 100 may extract additional image data (e.g., higher resolution image data) for windows within the image where threshold differences have been detected in the subset of image data. The system 100 then processes the additional image data to determine whether it is indicative of relevant physical activity. By extracting additional image data at only points of interest, the system 100 may be able to provide more accurate image analysis while still limiting the processing power and battery power needed to perform the image analysis.

Figure 6:
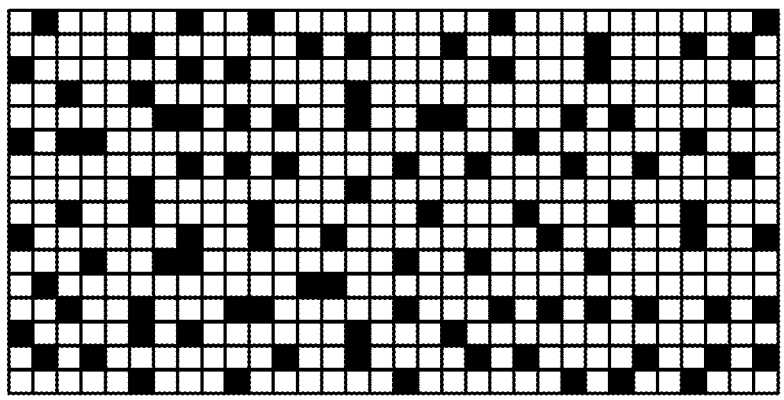
FIG. 6 illustrates example comparisons to a reference image.
Figure 6:
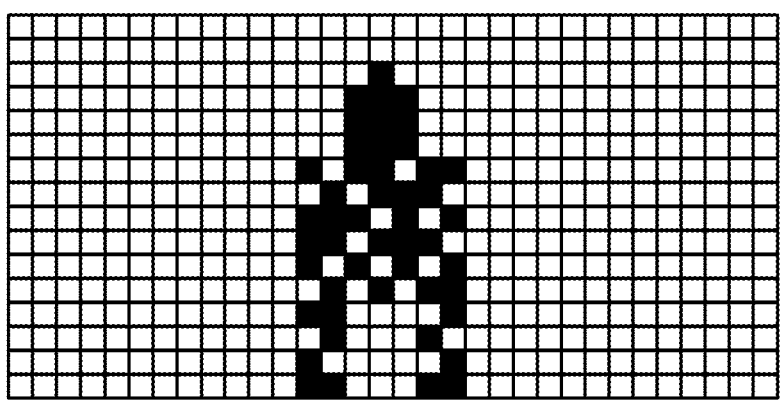
Figure 6:
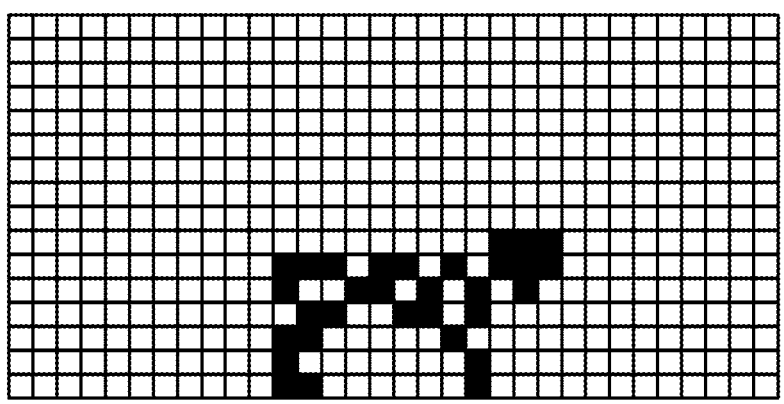

FIG. 6 illustrates example comparisons to a reference image. As shown, the filled pixels indicate pixels where a threshold difference between a current image and a reference image was detected and the unfilled pixels indicate pixels where a threshold difference between a current image and a reference image was not detected. The pixel map 610 illustrates an example of image in which relevant activity is not detected. For example, the system 100 may analyze the number and spacing of the pixels where the threshold difference between the current image and the reference image was detected. In this example, the system 100 detects a relatively high number of pixels as meeting the threshold difference and being spread relatively evenly across the pixel map 610. In this example, the system 100 determines that the image data is not indicative of relevant activity and more likely represents a cloud placing by the field of view of the camera or a gust of wind causing movement of many objects within an outdoor background scene. Accordingly, the system 100 discards the image.

The pixel map 620 illustrates an example of image in which relevant activity is detected. For example, the system 100 may analyze the number and spacing of the pixels where the threshold difference between the current image and the reference image was detected. In this example, the system 100 detects the pixels meeting the threshold difference as being compactly spaced in the shape of human being. In this example, the system 100 determines that the image data is indicative of relevant activity (e.g., a human being moving within the area proximate to the camera) and processes the image.

The pixel map 630 illustrates an example of image in which relevant activity is not detected. For example, the system 100 may analyze the number and spacing of the pixels where the threshold difference between the current image and the reference image was detected. In this example, the system 100 detects the pixels meeting the threshold difference as being compactly spaced in the shape of a pet. In this example, the system 100 determines that the image data is indicative of irrelevant activity because it shows images of the user's pet and not an intruder. Accordingly, the system 100 discards the image. In making the determination, the system 200 may compare the pixel map 630 to a reference pixel map of the user's pet to more accurately detect when a captured image is of the user's pet. In other examples, the user may be interested in images of the user's pet and the system 100 may detect the image data as being indicative of relevant activity.

Referring again to FIG. 3, the system 100 handles the one or more images captured by the camera unit based on the determination (340). For example, the system 100 discards the one or more images captured by the camera unit based on a determination that the one or more images captured by the camera unit do not include image data that is indicative of relevant physical activity within the area corresponding to the location of the camera unit. In this example, when the image analysis is performed by the camera unit itself, the one or more images are discarded at the camera unit without using the power needed to transmit the one or more images to a gateway. In addition, the system 100 transmits, from the camera unit to the gateway, the one or more images captured by the camera unit based on a determination that the one or more images captured by the camera unit include image data that is indicative of relevant physical activity within the area corresponding to the location of the camera unit.

FIG. 7 illustrates an example process 700 for determining whether to transmit images to a remote monitoring server. The process 700 may be performed in handling one or more images captured by the camera unit based on a determination of whether the one or more images include image data that is indicative of relevant physical activity, as described with respect to reference numeral 340.

The system 100 determines whether analysis of an image indicates relevant physical activity (710). For example, the system 100 determines whether a captured image includes image data indicative of relevant physical activity using the techniques described above with respect to reference numeral 330 and FIG. 5.

In response to a determination that the analysis of the image does not indicate relevant physical activity, the system 100 discards the image (715). For instance, the system 100 deletes the image without transmitting it to another device and without maintaining a copy of the image in electronic storage.

In response to a determination that the analysis of the image indicates relevant physical activity, the system 100 accesses one or more rules for transmitting images to a remote monitoring server (720). For example, the system 100 may access one or more security system rules that control whether the image captured by the camera unit is transmitted from a gateway to a remote monitoring server based on one or more events detected by a security system that monitors a property associated with the area corresponding to the location of the camera unit. In this example, the one or more security system rules may define security system events that indicate whether the captured images are important. For instance, a security system rule may indicate that the image should be transmitted if the security system detects an alarm event and that the image should not be transmitted if the security system does not detect an alarm event. A security system rule also may indicate that the image should be transmitted if the security system detects activity within a property (e.g., through one or more of a door sensor, a window sensor, and a motion sensor of the security system) that confirms motion detected by a motion sensor embedded in the camera unit. The rule may require that the confirming activity be in a location nearby the location of the camera unit. If the security system does not detect activity within the property that confirms motion detected by the motion sensor embedded in the camera unit within a threshold period of time, the rule indicates that the image should not be transmitted.

In some implementations, the system 100 may access one or more user-defined rules that control whether the one or more images captured by the camera unit are transmitted from the gateway to the remote monitoring server. In these implementations, the user-defined rules may control transmission based on a number of images that have been transmitted from the gateway to the remote monitoring server within a particular period of time and/or an amount of data charges that have been incurred from transmission of data from the gateway to the remote monitoring server within a particular period of time. For instance, a user may set a limit on the number of messages transmitted and/or the amount of costs incurred through transmission of image data.

In some examples, the accessed one or more rules may be a combination of security system rules and user-defined rules. In these examples, a rule may set a limit on the number of messages transmitted and/or the amount of costs incurred through transmission of image data, unless the security system detects an alarm event, in which case the limits are allowed to be exceeded.

The system 100 monitors security system events and/or user input with respect to the one or more rules (730). For example, the system 100 monitors for events detected by a security system that monitors the property associated with the area corresponding to the location of the camera unit (e.g., door sensor events, motion sensor events, window sensor events, alarm events, passcode entry events, etc.) and, based on the monitoring, compares events detected by the security system to one or more security system rules.

In addition, the system 100 may monitor for user input related to transmitting images to the remote monitoring server. For instance, the system 100 may monitor for user input requesting that captured images be sent to the remote monitoring server. The user input may be provided directly to the camera or the gateway, or may be provided to the remote monitoring server, which sends a command to the gateway to cause transmission of the captured images. In some implementations, the system 100 may send a message to a device (e.g., mobile device) of a user associated with the property to request whether the user would like the captured images transmitted to the remote monitoring server. The user can respond by either authorizing transmission or declining transmission. The message also can indicate that additional fees are required for the transmission and ask the user to authorize the additional fees if the user would like to transmit the image to the remote monitoring server where it can be viewed by the user. The message further may indicate status of security system sensors to assist the user in making the decision of whether or not to authorize transmission of the image.

The system 100 determines whether to transmit the image to a remote monitoring server based on application of the one or more rules to the monitored security system events and/or user input (740). For example, the system 100 determines whether to transmit the one or more images captured by the camera unit from the gateway to the remote monitoring server based on the comparison of the events detected by the security system to one or more security system rules. In this example, if a security system rule indicates that the image should be transmitted if the security system detects an alarm event, the system 100 determines whether an alarm event has been detected and, based on that determination, determines to transmit the image when an alarm event has been detected and determines not to transmit the image when an alarm event has not been detected. If a security system rule indicates that the image should be transmitted if the security system detects activity within a property that confirms motion detected by a motion sensor embedded in the camera unit, the system 100 determines whether confirming activity has been detected and, based on that determination, determines to transmit the image when confirming activity has been detected and determines not to transmit the image when confirming activity has not been detected.

In implementations in which user-defined rules exist, the system 100 compares circumstances of the transmission with the user-defined rules. For instance, if a user-defined rule sets a limit on the number of images transmitted from the gateway to the remote monitoring server within a month, the system 100 determines the number of images that have been transmitted from the gateway to the remote monitoring server within the past month and compares the determined number of images that have been transmitted from the gateway to the remote monitoring server within the past month to the limit. When the system 100 determines that the limit has not been reached, the system 100 determines to transmit the image and, when the system 100 determines that the limit has been reached, the system 100 determines not to transmit the image. The system 100 may consider cost of transmitting the image in a similar manner.

The system 100 also may consider user input related to transmitting the image in determining whether to transmit the image. For instance, when the system 100 receives user input requesting/authorizing transmission of the image, the system 100 determines to transmit the image. When the system 100 receives user input declining transmission of the image or does not receive any user input in response to requesting authorization to transmit the image, the system 100 determines not to transmit the image.

In some examples, the system 100 may analyze a combination of security system rules and user-defined rules in making the determination of whether to transmit the image. In these examples, the system 100 may transmit the image if a set limit on the number of images transmitted in the past month has been exceeded, but the system 100 detects an alarm event or the system 100 receives user input authorizing additional fees needed to transmit the image.

In response to a determination to transmit the image to the remote monitoring server, the system 100 transmits the image to the remote monitoring server (745). For instance, the gateway transmits the image to the remote monitoring server using a long range wireless communication protocol.

In response to a determination not to transmit the image to the remote monitoring server, the system 100 determines whether to discard the image based on application of the one or more rules to the monitored security system events and/or user input (750). For example, the system 100 may use techniques similar to those described above with respect to reference numeral 740 to determine whether to maintain the image in storage and continue monitoring for security system events and/or user input. In this example, a security system rule may indicate that the image should be transmitted if the security system detects an alarm event. When the system 100 determines that an alarm event has not been detected, but that the security system remains in a potential alarm state (e.g., during an entry delay period in which a user can enter a passcode to deactivate the security system), the system 100 determines to continue monitoring for an alarm event that would trigger transmission of the image. Alternatively, when the system 100 determines that an alarm event has not been detected and the security system has entered a deactivated state (e.g., a proper passcode was entered to deactivate the security system), the system 100 determines to discard message and abort monitoring for security system events that would trigger transmission of the image.

In another example, a user-defined rule may indicate that authorization to transmit the image is needed because the monthly number and/or cost of images has been exceeded. In this example, when the system 100 has requested authorization, but has not received a response, the system 100 determines not to transmit the message and to continue monitoring for authorization to transmit the image. Alternatively, when the system 100 has requested authorization and received a response declining authorization, the system 100 determines to discard message and abort monitoring for authorization to transmit the image.

In response to a determination to discard the image, the system 100 discards the image (755). For instance, the system 100 deletes the image from electronic storage of the gateway without transmitting it to the remote monitoring server.

In response to a determination not to discard the image, the system 100 continues to monitor for security system events and/or user input with respect to the one or more rules. For instance, the system 100 continues to analyze detected security system events and any received user input to determine whether any of the rules for transmitting the image or discarding the image have been satisfied.

Figure 8A:
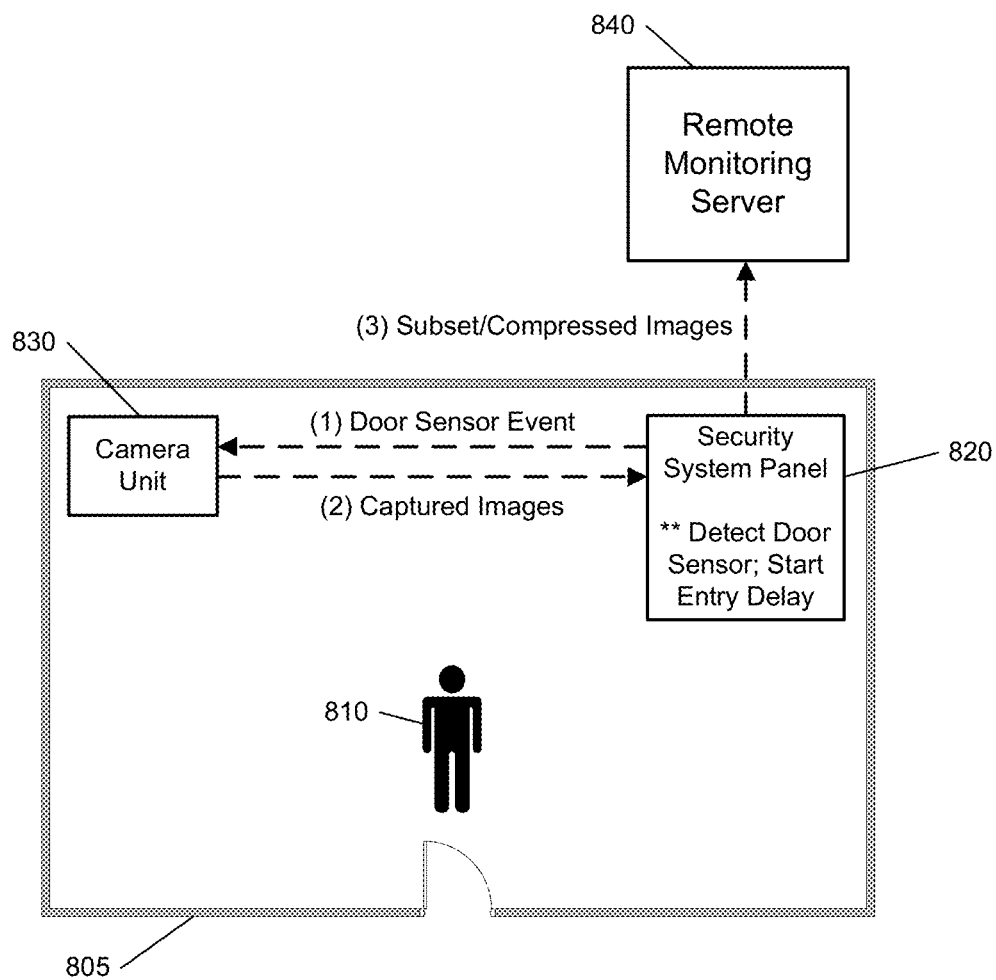
FIGS. 8A-8C illustrate an example of determining whether and how to transmit images to a remote monitoring server based on security system events.
Figure 8B:
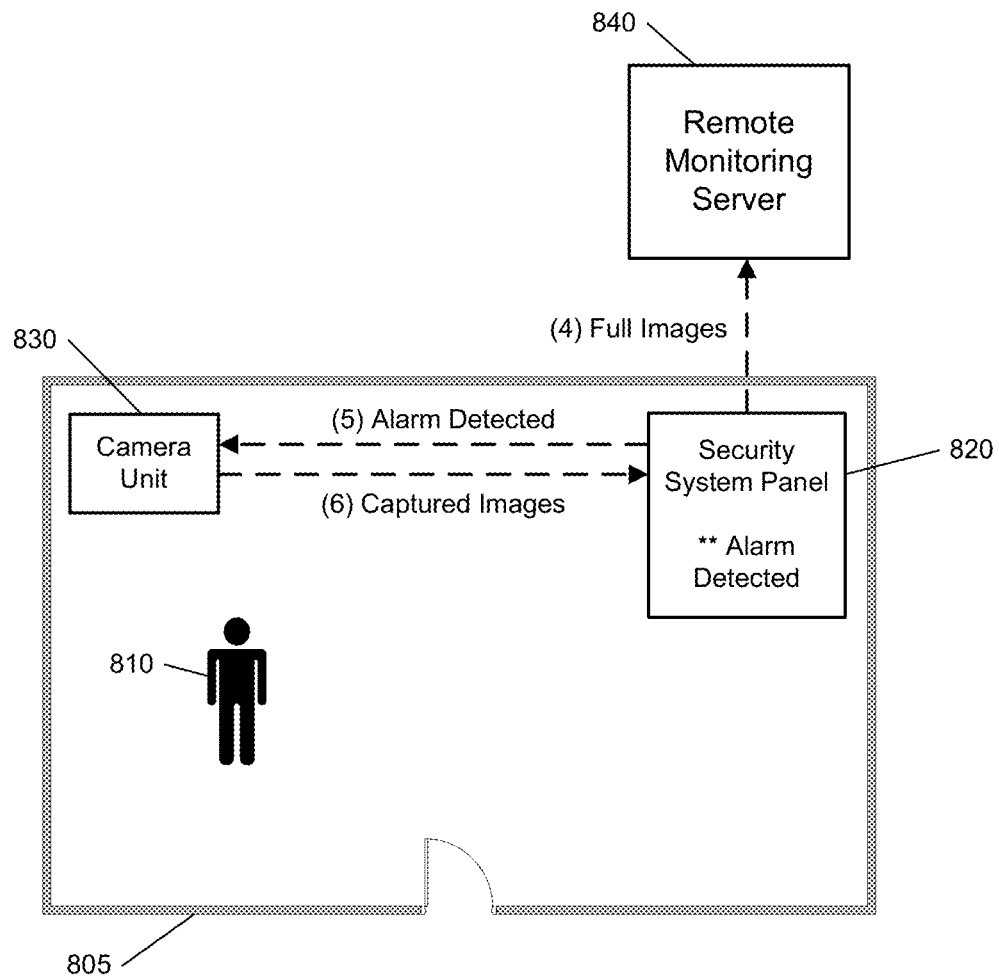
Figure 8C:
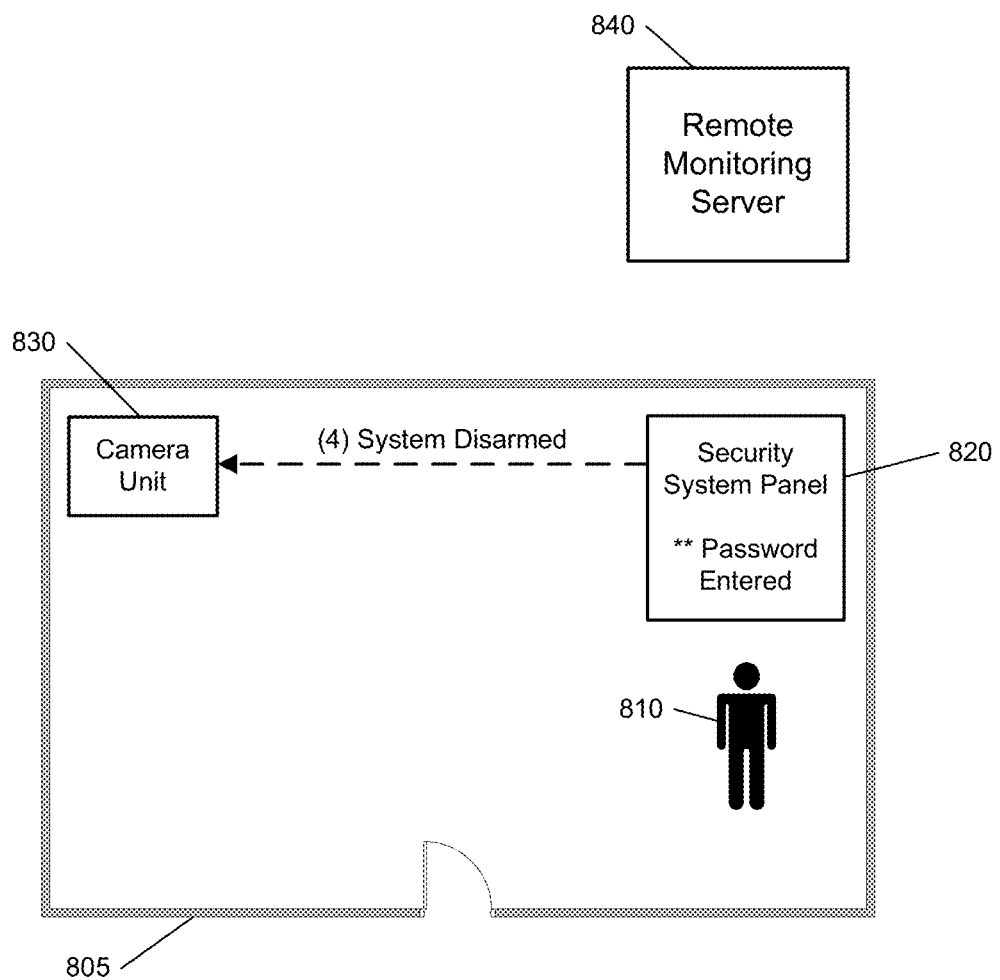

FIGS. 8A-8C illustrate an example of determining whether and how to transmit images to a remote monitoring server based on security system events. As shown, a property 805 of a user 810 is monitored by a security system, which includes a security system panel 820. The property 805 also includes a camera unit 830 that communicates over a short range wireless protocol with the security system panel 820. The security system panel 820 also communicates with a remote monitoring server 840 over a long range wireless communication channel. Because it is relatively expensive to transmit data over the long range wireless communication channel, the security system panel 820 makes intelligent decisions regarding when and how to send image data captured by the camera unit 830 to the remote monitoring server 840. The security system panel 820 uses detected security system events to determine when and how to send image data captured by the camera unit 830 to the remote monitoring server 840.

In the example shown in FIG. 8A, the user 810 enters the property 805 through a door when the security system is in an armed state and the security system panel 820 detects opening of the door based on output from a door sensor that senses whether the door is in an open or closed position. Based on detection of the door opening when the security system is in the armed state, the security system panel 820 sends a command to the camera unit 830 and also starts an entry delay period in which the user 810 is able to enter a passcode to deactivate the security system. The command may indicate that a door opening has been detected or may simply be a command to control the camera unit 830 to capture an image.

In response to receiving the command from the security system panel 820, the camera unit captures one or more still images of the property 805 and transmits the captured images to the security system panel 820 over the short range wireless protocol. In some implementations, as discussed throughout this disclosure, the camera unit 830 may analyze the captured images to confirm that the captured images include image data indicative of relevant/interesting activity prior to transmitting the captured images to the security system panel 820.

The security system panel 820 receives the captured images from the camera unit 830 and stores the captured images in memory. The security system panel 820 transmits, to the remote monitoring system 840, a compressed version of a subset of the captured images received from the camera unit 830. For example, the security system panel 820 may receive multiple images from the camera unit 830 and select a subset of the images to transmit to the remote monitoring system 840 (e.g., only the first image, a series of images at a lower frequency than captured by the camera unit 830, or the captured image that has the highest likelihood of including relevant activity based on image analysis). The security system panel 820 then transmits the one or more selected images to the remote monitoring server 840 in a compressed format. In this example, the security system panel 820 transmits only a subset of the captured images in a compressed format to save costs of transmitting data over the long range wireless communication channel because the security system is still in the entry delay period in which an alarm event has not been detected and the user 810 may still enter a passcode to deactivate the security system. The security system panel 820 transmits the subset of compressed images so that the remote monitoring server 840, which is located separate from the property 805, receives at least some image data in the event that an intruder enters the property 805 and destroys the security system panel 820 prior to expiration of the entry delay period.

After transmitting the subset of compressed images, the security system panel 820 monitors for entry of the passcode during the entry delay period to determine whether to send any additional image data to the remote monitoring server 840. In the example shown in FIG. 8B, the user 810 does not provide a proper passcode to the security system panel 820 prior to expiration of the entry delay period and the security system panel 820 detects an alarm event based on expiration of the entry delay period without receiving a proper passcode. In response to detecting the alarm event, the security system panel 820 transmits, to the remote monitoring sever 840, full versions of the image captured by the camera unit 830. Because an alarm event has been detected and the images captured by the camera unit 830 are likely to be important enough to justify the cost of transmission to the remote monitoring server 840, the security system panel 820 transmits all of the image data to the remote monitoring server 840. In some examples, for the subset of compressed images transmitted to the remote monitoring server 840, the security system panel 820 may transmit only the image data necessary to bring the compressed images to full resolution. Also, as described throughout this disclosure, the full image data may include a reference image and, for successive images, differential data that describes the differences between the successive images and the reference image. Transmitting the differential data may save costs of transmitting data over the long range wireless communication channel when relatively small differences exist between the images.

In addition to transmitting all of the image data to the remote monitoring server 840, the security system panel 820 sends a command to the camera unit 830. The command may indicate that an alarm event has been detected or may simply be a command to control the camera unit 830 to capture an image. In response to receiving the command from the security system panel 820, the camera unit continues to capture one or more still images of the property 805 and continues to transmit the captured images to the security system panel 820 over the short range wireless protocol. In some implementations, the camera unit 830 may capture images at a higher frequency after the alarm event has been detected and/or may transmit all captured images to the security system panel 820 without first analyzing the images to determine whether the images include image data indicative of relevant/interesting activity.

In the example shown in FIG. 8C, the user 810 provides a proper passcode to the security system panel 820 prior to expiration of the entry delay period and the security system panel 820 detects entry of the proper passcode and deactivates the security system. In response to detecting the entry of the proper passcode, the security system panel 820 determines not to transmit full versions of the images captured by the camera unit 830 to the remote monitoring server 840. Because an alarm event has not been detected, the images captured by the camera unit 830 are likely not to be important enough to justify the cost of transmission to the remote monitoring server 840. Accordingly, the security system panel 820 discards all of the image data without transmitting additional image data to the remote monitoring server 840. In addition, the security system panel 820 sends a command to the camera unit 830. The command may indicate that system has been disarmed or may simply be a command to control the camera unit 830 to stop capturing images. In response to receiving the command from the security system panel 820, the camera unit stops capturing images of the property 805.

As illustrated by the example situations shown in FIGS. 8A-8C, the security system panel 820 intelligently controls whether and how to transmit images to the remote monitoring server 840 based on additional information detected by the security system. In this regard, the security system panel 820 strikes a balance between the likely importance of the images captured by the camera unit 830 and the cost of transmitting image data over the long range communication channel.

In some implementations, an alarm system and/or a camera unit engages in two-way cellular communications with a back end monitoring server (e.g., the remote monitoring server 130 or the monitoring application server 260). In these implementations, the back end monitoring server collects a vast amount of data from the alarm system about the property monitored by the alarm system. For example, the back end monitoring server may monitor alarm system and/or image data over relatively long periods of time to derive typical arming schedules, typical property usage schedules, and/or false alarm/image schedules. In this example, the back end monitoring server may consider alarm system and/or image data from the monitored property alone, but also alarm system and/or image data from the many, different alarm systems managed by the back end monitoring server. Further, the back end monitoring server may receive user input from users of the monitored property regarding the users preferences related to receiving image data captured by the camera unit. Accordingly, the back end monitoring server is able to develop sophisticated rules/metadata for use in controlling image capture/transfer based on the collected data about the property and/or the user preferences.

In this regard, intelligence can be derived from the rules/metadata to exact more efficient camera behavior and affordable deployments. For example, the back end monitoring server may send a cellular communication to the alarm system and/or the camera unit to indicate when images should be transmitted and when they should not be transmitted based on the rules/metadata developed by the back end monitoring server. In this example, the back end monitoring server also may transmit commands based on the rules/metadata to the alarm system and/or the camera unit that cause updates to the image analysis processes used to determine whether an image does or does not include relevant physical activity (e.g., use a higher threshold for detecting motion during a time period that the back end monitoring server has learned to be a time period where legitimate activity is typical or a time period where false alarms are relatively high and use a lower threshold for detecting motion during a time period that the back end monitoring server has learned to be a time period where legitimate activity is not typical or a time period where false alarms are relatively low). Through the use of the rules/metadata and connection to back-end intelligence, an image service as described throughout this disclosure may be provided more efficiently via a cellular communication channel.

Figure 9:
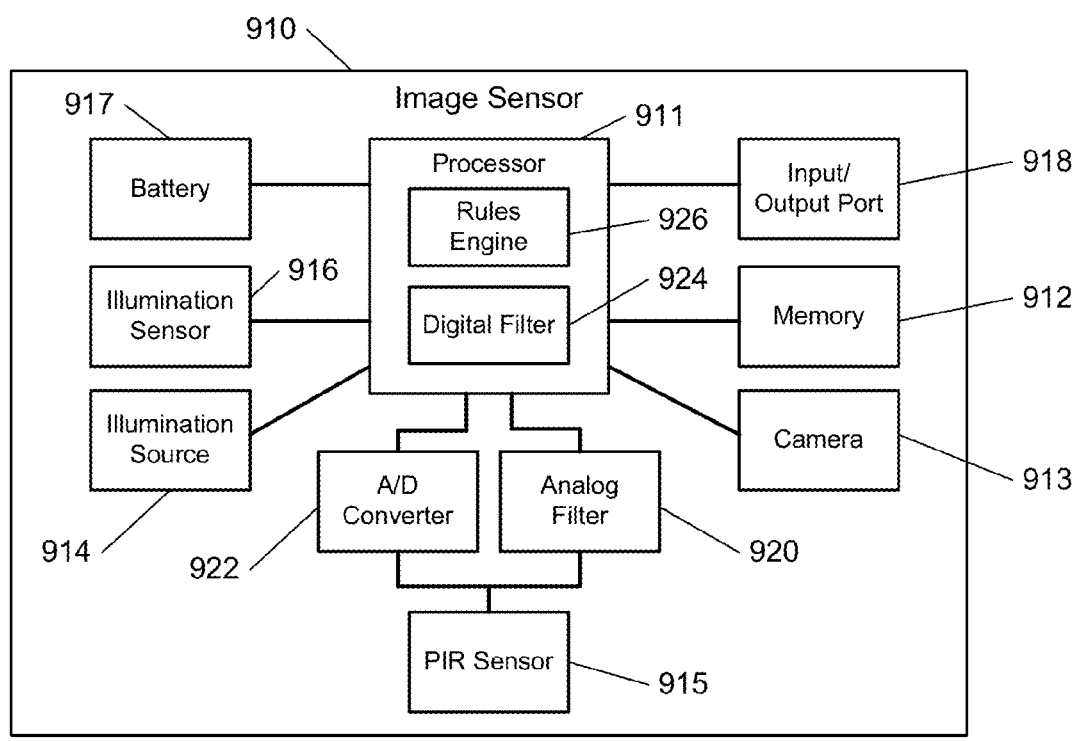
FIG. 9 illustrates an example image sensor.

FIG. 9 illustrates an example image sensor 910. The image sensor 910 may be used as the camera unit 110 shown in FIG. 1 and as any camera unit or image sensor referred to throughout this disclosure. The image sensor 910 includes a processor 911, a memory 912, a camera 913, an illumination source 914, a PIR sensor 915, an illumination sensor 916, a battery 917, and an input/output port 918. The processor 911 controls operations of the image sensor 910 and may be any suitable processor. The memory 912 stores instructions that are executed by the processor 911 and also stores images captured by the camera 913. The memory 912 may be any type of memory that is capable storing data and may include a combination of multiple, memory units. For example, the memory 912 may be a Flash memory component that stores both instructions that are executed by the processor and images captured by the camera 913.

The camera 913 captures images of an area proximate to where the image sensor 910 is located. The camera 913 may be any suitable digital camera. The illumination source 914 may be any source of illumination that improves capturing of images in a dark area. For example, the illumination source 914 may include one or more Infra Red LEDs that emit Infra Red light over an area within a field of view of the camera 913 to illuminate objects within the area. The processor 911 may control the illumination source 914 to emit light when the illumination sensor 916 detects a level of light that is below a threshold level.

The PIR sensor 915 is an electronic sensor that measures Infra Red light radiating from objects in its field of view. The PIR sensor 915 may be used to sense movement of people, animals, or other objects in the range of the sensor.

The battery 917 is the power source of the image sensor 910 and may be any type of battery capable of delivering power to the image sensor 910. The battery 917 may have a relatively small size and may be a standard type of battery available for purchase at retail stores. The battery 917 may be located in a compartment that is easily accessible to a user of the image sensor 910 to facilitate changing of the battery 917, which may occur relatively frequently (e.g., every couple of months) depending on the power consumption and image capture settings of the image sensor 910.

The input/output port 918 is a communication interface through which the camera unit may send and receive communications. The input/output port 918 may, using a short range wireless protocol (e.g., Bluetooth, Z-Wave, ZigBee, local wireless 900 MHz communication band, etc.), receive and send short range wireless communications with other devices, such as a gateway or control panel that is part of a monitoring system in which the image sensor 910 is included. The input/output port 918 also may include a module that enables long range wireless communications. For instance, the input/output port 918 may include a GSM module that enables communications over a cellular network. In some implementations, the input/output port 918 includes a wired communication module that enables wired communications. In these implementations, the wired communication module may be an Ethernet port that enables communications over an Internet Protocol based network. The input/output port 918 may be configured to communicate directly with a remote server (e.g., the remote monitoring server 130 shown in FIG. 1) that receives data from and controls configuration of the image sensor 910.

The image sensor 910 also includes an analog filter 920 that filters output from the PIR sensor 915. The analog filter 920 may be an analog circuit with one or more analog filters and hard wired control circuitry used to detect when motion is detected by the PIR sensor 915. The analog filter 920 may be any type of analog filter that filters out noise from the output of the PIR sensor 915. The analog filter 920 may offer a low power option for detecting relevant motion from the PIR sensor 915, but is inflexible in that the analog circuitry of the analog filter is difficult to change and inconvenient to adapt if the filtering operations of the analog filter 920 prove to be too strong or too weak.

The image sensor 910 further includes an analog-to-digital converter 922 that digitizes the analog out of the PIR sensor 915. The analog-to-digital converter 922 passes the digitized output to the processor 911 that operates a digital filter 924. The digital filter 924 performs a digital filtering process on the digitized output from the analog-to-digital converter 922. The digital filtering process may attempt to filter out noise from the output of the PIR sensor 915 and perform any types of analysis operations that assist in determining whether the output of the PIR sensor 915 reflects relevant motion. The digital filter 924 may be changed by reprogramming the digital filtering operations performed by the processor 911. Thus, the digital filter 924 is flexible in that it may be adapted if the filtering operations of the digital filter 924 prove to be too strong, too weak, or otherwise inaccurate. However, to be effective alone, the digital filter 924 may be relatively high power because the digital filter 924 would have to wake up and process the digitized output of the PIR sensor 915 at a sufficient frequency (e.g., twenty hertz) to an avoid missing relevant motion.

To achieve the low power benefits of the analog filter 920 and the flexibility of the digital filter 924, the image sensor 910 uses a combination of the analog filter 920 and the digital filter 924 to detect motion based on output of the PIR sensor 915. Specifically, the analog filter 920 is used to trigger when the digital filter 924 wakes up and processes the digitized output of the PIR sensor 915. For instance, the analog filter 920 may be set to a relatively low filtering setting that filters out general noise, but triggers the digital filter 924 to wake up in response to any output that is reasonably close to relevant motion. The processor 911 and the digital filter 924 remain in a sleep mode that does not consume (or consumes relatively low) battery power until a trigger is received from the analog filter 920. Based on the trigger being received, the processor 911 wakes up and performs the digital filtering operations of the digital filter 924 on the digitized output from the analog-to-digital converter 922. With this configuration, the image sensor 910 may combine some hard wired circuitry to wake up the processor 911 when any non-noise PIR motion is detected and then the processor 911 operates the digital filter 924 to determine whether the motion is real or not. In these implementations, the processor 911 may sample faster when it is woken up, than when it is woken up periodically, because the processor 911 is woken up so infrequently. Thus, each operation of the digital filter 924 may use more power because the digital filter 924 is operated less frequently. Accordingly, the image sensor 910 may have better battery life and still offer flexibility in the configuration of the digital filter 924.

In addition, the image sensor 910 includes a rules engine 926. The rules engine 926 is an interpreter operated by the processor 911. The rules engine 926 is able to interpret and run relatively small interpreted scripts. The interpreted scripts may define any combination of possible operations the image sensor 910 performs and may define rules based on any of the input available to the image sensor 910. The interpreted scripts may be defined by a remote monitoring server (e.g., the remote monitoring server 130 shown in FIG. 1), received by the image sensor 920 through the input/output port 918, and run by the rules engine 926. Accordingly, the rules engine 926 enables remote configuration of the image sensor 910 and may provide an easy and flexible way to control and adapt the image sensor 910.

In some implementations, the rules engine 926 is made up of two main components: a programming language interpreter that executes scripts/programs, and a trigger manager that decides which script/program to execute in response to a given event.

The scripts define the functionality of the image sensor 910. In particular, the scripts may include one or more instructions or rules that, when executed by the rules engine 926, define the manner in which signals received by the image sensor 910 are to be handled. The scripts are designed to be small in size (e.g., a size that is a little larger than an alarm code or signal) because they define a specific functionality selected by a user. Therefore, communicating the scripts to the image sensor 910 may require far less communication bandwidth and development time than firmware updates required by traditional monitoring systems and image capture devices.

In some examples, a process may be performed for creating and sending a script to the image sensor 910. The process begins when a client device initiates communication with a remote monitoring server. In response to the initiation of communication, the monitoring server presents an interface to the client device. The interface enables a user to create a script for use in the image sensor 910. Specifically, the interface is configured to accept one or more parameters provided by the user. In some implementations, the one or more parameters are variables that may be used to customize an instruction template. In other implementations, the one or more parameters provided by the user are terms in a programming language used by the user to flexibly define an instruction for the image sensor 910.

In some implementations, the interface provided to client device may be one or more webpages. In other implementations, the interface provided to client device may be a standalone application running on the client device. However, the interface may take any form through which parameters may be specified by a user of the client device.

The monitoring server receives the one or more parameters from the client device. The monitoring server translates the one or more received parameters into an interpreted script and sends the interpreted script to the image sensor 910. The interpreted script represents one or more instructions or "rules". In some implementations, these rules may take on the basic form: if X, then Y. In these implementations, the parameters received from the client device may be used to define X and Y. For example, a rule may specify that "if the image sensor 910 detects motion between hours X, then the image sensor 910 controls the camera 913 to take a picture and sends it to Y." However, the rules are not limited to this basic format and may include any combination of loops, variables, conditional statements, and any other logical constructs.

The monitoring server may automatically translate the rule into a script. However, in some implementations, the translation process may require the input of one or more programmers at the monitoring server. In the case where the monitoring server automatically translates the rule, the monitoring server may, for example, employ a type of compiler that translates the user input into the script. For example, a user may select a rule that controls the image sensor 910 to immediately send any image captured by the camera 913 based on motion detected by the PIR sensor 915 if no motion has been detected by the PIR sensor 915 or any other motion sensors in the monitoring system for two hours or more. The monitoring server may determine address information associated with the image sensor 910 in order to send scripts to the image sensor 910.

In some implementations, rules exist in the context of events, triggers, and actions. Specifically, rules may determine what actions should be taken in response to an event that satisfies a trigger: Events→Triggers→Rules→Actions.

Events can be anything that the image sensor 910, or its sensors, can generate and may include any monitoring system input the image sensor 910 receives, such as, but not limited to sensor opening, closing, alarms, panel arming, message receipt, etc. Triggers are the link between events and rules. Rules may be executed in response to certain sensor, panel, zwave, or schedule events. Triggers are what determine which event invokes which rule. In some implementations, a trigger acts as an interrupt within the image sensor 910 to cause the image sensor 910 to analyze the signals received by the image sensor 910 with respect to one or more rules associated with the trigger.

For example, in the case where the image sensor 910 receives signals from multiple sensors, an event may be a change in state related to any of the multiple sensors. A trigger may define a specific type of change in state; for example, any door opening. Such a trigger acts as an interrupt within the image sensor 910 to cause the image sensor 910 to evaluate any rules associated with a door opening.

Rules may be sequences of instructions, similar to instructions that may be found in any programming language, together with variables, registers, a stack, etc. Instructions include Boolean instructions, math, jump, control flow, store, retrieve, etc. Rules and triggers are the dynamic part of an interpreter. They can be uploaded and stored into the image sensor 910 (e.g., over the air through a wireless communication channel). In some implementations, events and instructions may be the static part of the interpreter. They may be designed into the image sensor 910 during the development phase.

In some implementations, an interpreter is, itself, an interpreted programming language. The interpreter may include a set of instructions (e.g., about one hundred instructions), similar to instructions that may be found in other computing languages such as C, Visual Basic, or assembly language. Instructions include loops, tests, function calls, variable assignments, math, timekeeping, etc. There are volatile and non-volatile variables, registers, and a stack. The script is a collection of rules that can be executed separately, or that can call each other. Rules may be uploaded remotely (e.g., over the air though a wireless communication channel), and are stored in flash (or other) memory in the image sensor 910.

Rules can be executed via backend commands (i.e., commands sent from the monitoring server telling the image sensor 910 to execute one or more rules). However, in most cases, rules are executed in response to events detected by the image sensor 910, events reported to the image sensor 910 by the monitoring system in which the image sensor 910 is included, and/or in response to timing events. The interpreter is "plugged in" to the image sensor 910 in such a way that any sensor, arming, alarm, trouble, or any potential event of interest can be used to trigger one or more rules. Rules can in turn cause certain actions on the image sensor 910. When a rule is developed, the developer specifies which event(s) should trigger the rule, if any.

The image sensor 910 receives the interpreted script from the monitoring server. The image sensor 910 may receive the interpreted script in real-time as the script is translated at the monitoring server or the image sensor 910 may receive the interpreted monitoring script during periodic or aperiodic updates sent to the image sensor 910. Once received, the image sensor 910 stores the monitoring script in a memory or storage device.

A trigger associated with a received script may be received simultaneously with the script or received separately. In some implementations, the monitoring script may be stored separately from the triggers. For example, the triggers may be stored in a first structure or memory and the rules may be stored in a second structure or memory. As described above, the triggers may act as interrupts. Thus, when one of the triggers is set off, it may cause one or more corresponding scripts to be executed by the rules engine 926. For example, a first trigger may be linked to a first set of scripts that are associated with first and second rules. Thus, when the first trigger is set off, the first and second scripts are executed. Similarly, a second trigger may be linked to a second set of scripts that are associated with a third rule and a third trigger may be linked to a third set of scripts that are associated with fourth and fifth rules.

After the receiving the interpreted script, the image sensor 910 may detect an event or receive a signal from a sensor connected to the monitoring system in which the image sensor 910 is included. As described above, the image sensor 910 may then employ triggers to determine when to execute the monitoring script. However, the image sensor 910 need not employ triggers. For example, in some implementations, the image sensor 910 may execute the monitoring script as part of a loop and, thus, continuously evaluate the one or more rules included in the monitoring script. In any case, execution of the monitoring script results in a comparison between the detected event or the received signal and the parameters included in the monitoring script.

The image sensor 910 may determine that a condition specified by the received interpreted script has been met based on a comparison between the detected event or the received signal and the parameters included in the received interpreted script. In other words, execution of the monitoring script causes a determination to be made whether the detected event or the received signal satisfies parameters included in a rule of the monitoring script (e.g., the condition of the rule). If the condition of the rule is met, then the image sensor 910 triggers an action associated with the rule of the monitoring script.

In some implementations, the action prompted by a condition in a rule may be an action that concludes the current instance of the script's execution. For example, the action may be to capture an image and send the captured image to the monitoring server or to another device. However, in some implementations, an action or a condition may require further processing. For instance, some rules may include a condition that requires a timer. A rule may state: if a door is open for five minutes, send an image of the door to a particular mobile device. The trigger for this rule would be any door opening. However, the condition of the rule requires execution of a timer in order to be fully evaluated. Therefore, in some implementations, the script associated with the above-described rule may create a new timer trigger and then pause the script's execution. The timer trigger is a special trigger that is created by an instance of a script being executed and then is deleted once the script execution completes. In this example, the timer trigger runs for five minutes and then triggers the script associated with the rule, notifying it that five minutes have elapsed. The script associated with the rule determines whether the door has continued to stay open, and if it has, the script causes an image of the door to be captured and sent to the particular mobile device.

In some implementations, the digital filter 924 is programmed based on one or more scripts executed by the rules engine 926. In these implementations, the output from the analog filter 920 is used as the trigger for the one or more scripts. Because the digital filter 924 is based on scripts, the operations of the digital filter 924 may be easily changed. For example, to change the digital filter 924, the monitoring server may define one or more new scripts for the digital filter 924 and send the new scripts to the image sensor 910. In this example, the image sensor 910 receives the new scripts through the input/output port 918, associates the new scripts within the trigger related to output from the analog filter 920, and uses the rules engine to execute the new scripts the next time the trigger related to output from the analog filter 920 is received.

The image sensor 910 may engage in two-way communications (e.g., cellular communications) to a back end monitoring server. The presence of rules/metadata on the back end monitoring server may be used to derive intelligence to exact more efficient image sensor 910 behavior and affordable deployments. For instance, the back end monitoring server may be able to tell the image sensor 910 when images should be transmitted and when they should not be. Through that capability, a service based on the image sensor 910 may be offered much more efficiently via the cellular channel. Connection to back-end intelligence may be leveraged using the rules engine 926 to adapt the operation of the image sensor 910 based on any of data available to the back-end.

In some examples, a script operated by the rules engine 926 may define a low power consumption mode that allows the camera to be aware of a schedule, and an arming state, and to receive messages which tell it to activate if it is in a sleep mode. The rules engine 926 may use wirelessly transmitted rules/metadata to update the image analysis processes in a networked image sensor environment.

In addition, scripts operated by the rules engine 926 may enable a variety of additional functionality. For instance, a script may be defined to estimate battery life and take one or more actions based on the battery life falling below one or more thresholds. Also, scripts may define dynamic image sensor behavior depending on state of the PIR sensor 915, and state of other sensors in the property. Scripts may define motion verification using multi-mode motion detection (e.g., infrared and image analytics). Scripts may map events to images using finite time slices to avoid keeping the image sensor 910 alive and transmitting all the time while still offering event-based image capture. Scripts may define operations to transmit an image index instead of actual images so that images can, if needed, be queried dynamically with transmission costs only incurred when needed. Scripts may define transmission cost reduction via partial image transmission or partial image zoom.

By using the rules engine 926 in the image sensor 910, the image sensor 910 may be easily configured from a remote location. Any of the inputs and actions described throughout this disclosure may be adapted using the rules engine 926 and the processes described above.

Described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, for example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. An image sensor comprising:
a camera configured to capture images of an area corresponding to a location of the image sensor;
a passive infrared motion sensor configured to sense motion in the location of the image sensor;
an analog filter that is configured to filter noise from the output of the passive infrared motion sensor and generate a trigger based on the output of the passive infrared motion sensor being indicative of motion other than noise;
an analog-to-digital convertor configured to digitize the output of the passive infrared motion sensor, the analog-to-digital convertor being configured to receive the output of the passive infrared motion sensor directly from the passive infrared motion sensor without passing through the analog filter;
a digital filter that is configured to receive the generated trigger from the analog filter and wake up to a processing mode from a sleep mode based on receipt of the generated trigger, the digital filter being configured to, in the processing mode, process the digitized output of the passive infrared motion sensor to determine whether the motion other than noise detected by the analog filter relates to real motion and being configured to, in the sleep mode, monitor for a trigger from the analog filter without processing the digitized output of the passive infrared motion sensor;
at least one processor configured to control the camera to capture an image based on the digital filter determining that the motion other than noise detected by the analog filter relates to real motion; and
a rules engine configured to enable remote configuration of the image sensor using interpreted scripts defined by a remote monitoring server,
wherein the digital filter is programmable based on digital filtering scripts received from the remote monitoring server and executed by the rules engine, and
wherein the image sensor is configured to reprogram the digital filter by:
receiving a new digital filtering script from the remote monitoring server, the new digital filtering script including instructions that, when executed by the rules engine, define new operations performed by the digital filter in processing signals from the analog-to-digital convertor, the new operations being different than operations performed by the digital filter in processing signals from the analog-to-digital convertor prior to receipt of the new digital filtering script,
associating the new digital filtering script with the trigger generated by the analog filter, and
using the rules engine to execute the new digital filtering script in response to receipt of the trigger generated by the analog filter.

2. The image sensor of claim 1, wherein the at least one processor is configured to ignore the motion other than noise detected by the analog filter based on the digital filter determining that the motion other than noise detected by the analog filter does not relate to real motion.

3. The image sensor of claim 1, further comprising:
a communication device configured to receive an interpreted script from a monitoring server that is located remote from the image sensor; and
an interpreter configured to:
receive a signal from a sensor related to a function associated with the image sensor, compare the received signal to a trigger that causes performance of the interpreted script, determine that the trigger defined by the interpreted script has been met based on comparison results, initiate performance of the interpreted script to evaluate a monitoring rule in accordance with one or more parameters based on the determination that the trigger has been met, and based on the evaluation of the monitoring rule revealing that the monitoring rule has been satisfied, cause performance of an action associated with the interpreted monitoring script.

4. The image sensor of claim 1, wherein the at least one processor is configured to perform operations comprising:

accessing one or more security system rules that control whether one or more images captured by the camera are transmitted to a remote monitoring server based on one or more events sensed by a security system that monitors a property associated with the area corresponding to the location of the image sensor, the security system including sensors that are separate from the camera and that are configured to sense events related to security of the monitored property;

monitoring for events sensed by the sensors included in the security system that monitors the property associated with the area corresponding to the location of the image sensor;

based on the monitoring, comparing one or more events sensed by the sensors included in the security system to the one or more security system rules;

determining whether to transmit the one or more images captured by the camera to the remote monitoring server based on the comparison of the one or more events sensed by the sensors included in the security system to the one or more security system rules; and based on a determination to transmit the one or more images captured by the camera from the gateway to the remote monitoring server, transmitting, from the gateway to the remote monitoring server, the one or more images captured by the camera.

5. The image sensor of claim 4, wherein accessing one or more security system rules that control whether the one or more images captured by the camera are transmitted to the remote monitoring server based on one or more events sensed by the security system that monitors the property associated with the area corresponding to the location of the camera comprises accessing a security system rule that controls the one or more images captured by the camera to be transmitted to the remote monitoring server based on the security system detecting an alarm event that results in a notification to a central monitoring station and that controls the one or more images captured by the camera to be withheld from the remote monitoring server based on the security system detecting an absence of the alarm event that results in the notification to the central monitoring station.

6. The image sensor of claim 4, wherein accessing one or more security system rules that control whether the one or more images captured by the camera are transmitted to the remote monitoring server based on one or more events sensed by the security system that monitors the property associated with the area corresponding to the location of the camera comprises accessing a security system rule that controls whether the one or more images captured by the camera are transmitted to the remote monitoring server based on activity detected within the monitored property by the sensors included in the security system.

7. The image sensor of claim 6, wherein accessing the security system rule that controls whether the one or more images captured by the camera are transmitted to the remote monitoring server based on activity detected within the monitored property by the sensors included in the security system comprises accessing a security system rule that controls whether the one or more images captured by the camera are transmitted to the remote monitoring server based on activity detected within the monitored property by the sensors included in the security system after the one or more images were captured by the camera.

8. The image sensor of claim 6, wherein accessing the security system rule that controls whether the one or more images captured by the camera are transmitted to the remote monitoring server based on activity detected within the monitored property by the sensors included in the security system comprises accessing a security system rule that controls whether the one or more images captured by the camera are transmitted to the remote monitoring server based on activity detected within the monitored property by a combination of at least one motion sensor that is separate from the camera and at least one door contact sensor that is separate from the camera and senses whether or not a door of the monitored property is in an open or closed position.

9. The image sensor of claim 4, wherein accessing one or more security system rules that control whether the one or more images captured by the camera are transmitted to the remote monitoring server based on one or more events sensed by the security system that monitors the property associated with the area corresponding to the location of the camera comprises accessing one or more security system rules that control whether the one or more images captured by the camera are transmitted to the remote monitoring server based on one or more events sensed by the security system after the one or more images were captured by the camera.

10. The image sensor of claim 4:

wherein the one or more images captured by the camera comprise multiple images;

wherein determining whether to transmit the one or more images captured by the camera to the remote monitoring server based on the comparison of the one or more events sensed by the sensors included in the security system to the one or more security system rules comprises determining to transmit a subset of the multiple images to the remote monitoring server based on the comparison of the one or more events sensed by the sensors included in the security system to the one or more security system rules; and wherein transmitting, to the remote monitoring server, the one or more images captured by the camera comprises transmitting, to the remote monitoring server, the subset of the multiple images without one or more images from the multiple images that are outside of the subset.

11. The image sensor of claim 4, wherein the operations further comprise:

based on a determination not to transmit the one or more images captured by the camera to the remote monitoring server, determining whether to discard the one or more images captured by the camera based on application of the one or more security system rules to the events sensed by the sensors included in the security system; and based a determination not to discard the one or more images captured by the camera, maintaining the one or more images captured by the camera in electronic storage and continuing to monitor for events sensed by the sensors included in the security system.

12. The image sensor of claim 4, wherein the operations further comprise:
   accessing one or more user-defined rules that control whether the one or more images captured by the camera are transmitted to the remote monitoring server based on a number of images that have been transmitted to the remote monitoring server within a particular period of time; and
   wherein determining whether to transmit the one or more images captured by the camera to the remote monitoring server based on the comparison of the one or more events sensed by the sensors included in the security system to the one or more security system rules comprises:
   determining the number of images that have been transmitted to the remote monitoring server within the particular period of time;
   comparing the determined number of images that have been transmitted to the remote monitoring server within the particular period of time to the one or more user-defined rules; and
   determining whether to transmit the one or more images captured by the camera to the remote monitoring server based on a combination of the comparison of the determined number of images that have been transmitted to the remote monitoring server within the particular period of time to the one or more user-defined rules and the comparison of the one or more events sensed by the sensors included in the security system to the one or more security system rules.

13. The image sensor of claim 1, wherein the sleep mode of the digital filter consumes less battery power than the processing mode of the digital filter.

14. The image sensor of claim 1, wherein the sleep mode of the digital filter does not consume battery power.

15. The image sensor of claim 1, wherein the digital filter is configured to be changed by reprogramming digital filtering operations performed by the digital filter in the processing mode.

16. The image sensor of claim 1, wherein the digital filter is configured to be woken up periodically based on triggers generated by the analog filter.

17. The image sensor of claim 1, wherein the rules engine is configured to execute a script that defines a low power consumption mode that allows the image sensor to be aware of a schedule and arming state and to receive messages which tell the image sensor to activate from a sleep mode.

18. The image sensor of claim 1, wherein the rules engine is configured to execute a script that controls the image sensor to immediately send any image captured by the camera based on motion detected by the passive infrared motion sensor if no motion has been detected by the passive infrared motion sensor or any other motion sensors for more than a threshold period of time, the script having been created by a user using an interface that is provided by the remote monitoring server and that accepts one or more parameters provided by the user to customize an instruction template.

19. The image sensor of claim 1, wherein the rules engine comprises a programming language interpreter that executes scripts, and a trigger manager that decides which script to execute in response to a given trigger.

20. The image sensor of claim 1:
   wherein the interpreted scripts defined by the remote monitoring server and executed by the rules engine include a combination of loops, variables, and conditional statements; and
   wherein the new digital filtering script received from the remote monitoring server includes a combination of loops, variables, and conditional statements that define the new operations performed by the digital filter in processing signals from the analog-to-digital convertor.

* * * * *